United States Patent [19]

Emert et al.

[11] Patent Number: 5,747,596

[45] Date of Patent: May 5, 1998

[54] GEL-FREE ALPHA-OLEFIN DISPERSANT ADDITIVES USEFUL IN OLEAGINOUS COMPOSITIONS

[75] Inventors: Jacob Emert, Brooklyn, N.Y.; Robert Dean Lundberg, Williamsburg, Va.; David John Lohse, Bridgewater, N.J.

[73] Assignee: Exxon Chemical Patents Inc., Linden, N.J.

[21] Appl. No.: 693,936

[22] Filed: Aug. 5, 1996

Related U.S. Application Data

[62] Division of Ser. No. 338,287, Nov. 10, 1994, Pat. No. 5,578,237, which is a continuation of Ser. No. 991,837, Dec. 17, 1992, abandoned.

[51] Int. Cl.$^6$ .................. C10M 145/22; C10M 145/20; C08F 255/02
[52] U.S. Cl. .................. 525/298; 525/301; 508/454; 508/455; 508/468; 508/221; 585/12; 585/13; 252/51.5
[58] Field of Search .................. 525/301, 398; 585/12, 13; 508/454, 455, 468, 221; 252/51.5

[56] References Cited

U.S. PATENT DOCUMENTS

| | | | |
|---|---|---|---|
| 3,316,177 | 4/1967 | Dorer, Jr. | 252/51.5 |
| 3,326,804 | 6/1967 | Hu | 252/34 |
| 3,563,964 | 2/1971 | Wagensommer | 260/80.78 |
| 3,697,429 | 10/1972 | Engel et al. | 252/59 |
| 4,089,794 | 5/1978 | Engel et al. | 252/51.5 |
| 4,137,185 | 1/1979 | Gardiner et al. | 252/33 |
| 4,144,181 | 3/1979 | Elliott et al. | 252/33 |
| 4,152,499 | 5/1979 | Boerzel et al. | 526/52.4 |
| 4,160,739 | 7/1979 | Stambaugh et al. | 252/34 |
| 4,161,452 | 7/1979 | Stambaugh et al. | 252/34 |
| 4,171,273 | 10/1979 | Waldbillig et al. | 252/51.5 |
| 4,219,432 | 7/1980 | Girgenti et al. | 252/51.5 |
| 4,234,435 | 11/1980 | Meinhardt | 252/51.5 |
| 4,306,041 | 12/1981 | Cozewith et al. | 526/65 |
| 4,505,834 | 3/1985 | Papay et al. | 252/51.5 |
| 4,507,515 | 3/1985 | Johnston et al. | 585/12 |
| 4,517,104 | 5/1985 | Bloch et al. | 252/51.5 |
| 4,540,753 | 9/1985 | Cozewith et al. | 526/88 |
| 4,557,847 | 12/1985 | Gutierrez et al. | 252/51.5 |
| 4,575,574 | 3/1986 | Kresge et al. | 585/520 |
| 4,632,769 | 12/1986 | Gutierrez et al. | 252/48.6 |
| 4,666,619 | 5/1987 | Kresge et al. | 252/56 |
| 4,668,834 | 5/1987 | Rim et al. | 585/12 |
| 4,693,838 | 9/1987 | Varma et al. | 252/51.5 |
| 4,704,491 | 11/1987 | Tsutsui et al. | 585/10 |
| 4,707,285 | 11/1987 | Brewster et al. | 252/50 |
| 4,749,505 | 6/1988 | Chung et al. | 252/51.5 A |
| 4,863,623 | 9/1989 | Nalesnik | 252/50 |
| 5,075,383 | 12/1991 | Migdal et al. | 525/293 |
| 5,112,507 | 5/1992 | Harrison | 252/51.5 A |
| 5,167,848 | 12/1992 | Chung et al. | 252/51.5 |
| 5,229,022 | 7/1993 | Song et al. | 585/12 |

FOREIGN PATENT DOCUMENTS

| | | |
|---|---|---|
| 2021959 | 6/1991 | Canada. |
| 128046 | 12/1984 | European Pat. Off.. |
| 129368 | 12/1984 | European Pat. Off.. |
| 171167 | 2/1986 | European Pat. Off.. |
| 257696 | 3/1988 | European Pat. Off.. |
| 295854 | 12/1988 | European Pat. Off.. |
| 305022 | 3/1989 | European Pat. Off.. |
| 352072 | 1/1990 | European Pat. Off.. |
| 369674 | 5/1990 | European Pat. Off.. |
| 396297 | 11/1990 | European Pat. Off.. |
| 62-129303 | 6/1987 | Japan. |
| 2055852 | 3/1981 | United Kingdom. |
| WO88/01626 | 10/1988 | WIPO. |

OTHER PUBLICATIONS

Y. Minoura, et al., Journal of Applied Polymer Science, vol. 13, pp. 1625–1640 (1969). "The Reaction of Polypropylene with Maleic Anhydride".

S. Cimmino et al., Polymer Engineering & Science, vol. 24, pp. 48–56 (2984). "Morphology –Properties Relationships in Binary Polyamide 6/Rubber Blends: Influence of the Addition of a Functionalized Rubber".

Encyclopedia of Polymer Science and Engineering, vol. 7, (Wiley Interscience, 1987), pp. 554–555.

A.J. Oostenbrink et al., in Integration of Fundamental Polymer Science and Technology –III, P.I. Lemstra and L.A. Kleintjens, eds. (Elsevier, 1989), pp. 123–127.

*Primary Examiner*—I. S. Zemel
*Attorney, Agent, or Firm*—K. R. Walton

[57] ABSTRACT

Gel-free dispersant additives for lubricating and fuel oil compositions comprise at least one adduct of (A) α-olefin homopolymer or interpolymer of 700 to 10,000 number average molecular weight, free radically grafted with an average of from about 0.5 to about 5 carboxylic acid producing moieties per polymer chain, and (B) at least one non-aromatic nucleophilic post-treating reactant selected from (i) amine compounds containing only a single reactive amino group per molecule, (ii) alcohol compounds containing only a single hydroxy group per molecule, (iii) polyamine compounds containing at least two reactive amino groups per molecule, (iv) polyol compounds containing at least two reactive hydroxy groups per molecule, (v) aminoalcohol compounds containing at least one reactive amino group and at least one reactive hydroxy group per molecule, and (vi) mixtures of (i) to (v); provided that when said post-treating reactant includes one or more of (iii), (iv) or (v), the reaction between (A) and (B) is conducted in the presence of sufficient chain-stopping or end-capping co-reactant (C) to ensure that the grafted and post-reacted product mixture is gel-free.

20 Claims, No Drawings

GEL-FREE ALPHA-OLEFIN DISPERSANT ADDITIVES USEFUL IN OLEAGINOUS COMPOSITIONS

This is a divisional of application Ser. No. 08/338,287, filed Nov. 10, 1994 now U.S. Pat. No. 5,578,237, which is a continuation of Ser. No. 07/991,837 filed Dec. 17, 1992, abandoned.

BACKGROUND OF THE INVENTION

FIELD OF THE INVENTION

This invention relates to improved oil soluble polymeric dispersant additives useful in oleaginous compositions, particularly oleaginous lubricating oil compositions. The additives, which are gel-free and substantially free from haze and cross-linking, comprise homopolymers or interpolymers of $C_3$ to $C_{28}$ alpha-olefins, preferably interpolymers of ethylene with propylene or 1-butene, which have been free radically grafted with monounsaturated carboxylic reactant, e.g., maleic anhydride, preferably in a solvent such as lubricating oil, and then reacted with a nucleophilic post-treating reactant selected from (i) amine compounds containing only a single reactive amino group per molecule, (ii) alcohol compounds containing only a single hydroxy group per molecule, (iii) polyamine compounds containing at least two reactive amino groups per molecule, (iv) polyol compounds containing at least two reactive hydroxy groups per molecule, (v) aminoalcohol compounds containing at least one reactive amino group and at least one reactive hydroxy group per molecule, and (vi) mixtures of (i) to (v); provided that when said post-treating reactant includes one or more of (iii), (iv) or (v), the reaction between the grafted polymer and the nucleophilic post-treating reactant is conducted in the presence of sufficient chain-stopping or end-capping co-reactant to ensure that the grafted and post-reacted product mixture is gel-free.

The α-olefin homopolymers and interpolymers, prior to being grafted with the carboxylic reactant have a number average molecular weight of from about 700 to about 10,000 and at least about 30 percent, and preferably at least about 60 percent of the polymer chains possess terminal ethenylidene, i.e., vinylidene, unsaturation.

Ashless ester and nitrogen containing lubricating oil dispersants have been widely used by the industry. Typically, these dispersants are prepared from a long chain hydrocarbon polymer by reacting the polymer with maleic anhydride to form the corresponding polymer which is substituted with succinic anhydride groups. Polyisobutylene has been widely used as the polymer of choice, chiefly because it is readily available by cationic polymerization from butene streams (e.g., using $AlCl_3$ catalysts). Such polyisobutylenes generally contain residual unsaturation in amounts of about one ethylenic double bond per polymer chain, positioned along the chain.

The polyisbutylene polymers (PIB) employed in most conventional dispersants are based on a hydrocarbon chain of a number average molecular weight ($M_n$) of from about 900 to about 2500. PIB having a $M_n$ of less than about 300 gives rather poor performance results when employed in dispersants because the molecular weight is insufficient to keep the dispersant molecule fully solubilized in lubricating oils. On the other hand, high molecular weight PIB ($M_n$>3000) becomes so viscous that conventional industrial practices are incapable of handling this product in many operations. This problem becomes much more severe as the PIB molecular weight increases to 5,000 to 10,000.

Increased amounts of terminal ethylenic unsaturation in polyisobutylene (so-called "reactive polyisobutylene") has been achieved by $BF_3$ catalyzed polymerization of isobutylene. Exemplary of references disclosing these polymers is U.S. Pat. No. 4,152,499. However, such reactive polyisobutylene materials can still contain substantial amounts of unsaturation elsewhere along the chain. Further, it is difficult to produce such reactive polyisobutylene polymers at molecular weights of greater than about 2,000, and, even so, the reactive polyisobutylenes themselves still suffer the above-noted viscosity increase disadvantages as molecular weights are increased.

Other polymers, such as ethylene-alpha-olefin interpolymers, (e.g., ethylene-propylene copolymers and terpolymers containing non-conjugated dienes), have been disclosed as suitable polymers for the preparation of ashless dispersants.

U.S. Pat. No. 4,234,435, for example, discloses dispersants prepared from polyalkenes, $M_n$ of 1,300 to about 5,000. The polyalkene can comprise homopolymers or interpolymers of $C_2$ to $C_{16}$ terminal olefins, of which ethylene-propylene copolymers are said to be examples, with specific reference to a copolymer of 80% ethylene and 20% propylene.

However, ethylene-alpha-olefin interpolymers of the above molecular weights could be produced using Ziegler-Natta catalysts only in combination with $H_2$ as molecular weight control in order to terminate the growing copolymer chains within this molecular weight range. Without use of $H_2$ or other conventional, so-called "chain-stoppers", the interpolymers produced with Ziegler-Natta catalysts would tend to have molecular weights greatly in excess of the above range. (Such higher copolymers, for example, are widely employed in ungrafted form as viscosity index improvers, and when grafted with nitrogen-containing groups, as described below, are conventionally employed as dispersant-viscosity index improver polymers.) The use of $H_2$ as a chain stopper has the disadvantage of causing the saturation of the olefinic double bond content of the copolymer. Thus, while lower molecular weight copolymers were theoretically possible to prepare, their low unsaturation content (and the accompanying low graft copolymer yields) would have made their further functionalization by a thermal "ene" reaction, e.g., with dicarboxylic acid moieties in preparing dispersants, highly unattractive.

High molecular weight ethylene-propylene copolymer and ethylene-propylene-diene terpolymers, having viscosity average molecular weights of from about 20,000 to 300,000, are generally produced employing Ziegler catalysts, generally $VCl_4$ or $VOCl_3$ with a halide source, such as organoaluminum halides and/or hydrogen halides. Such high molecular weight EP and EPDM polymers find use as viscosity index improvers. See, e.g., U.S. Pat. Nos. 3,563,964; 3,697, 429; 4,306,041; 4,540,753; 4,575,574; and 4,666,619.

The concept of functionalizing V.I. improving high molecular weight ethylene copolymers, with acid moieties such as maleic anhydride, followed by derivatizing with an amine, to form a V.I.-dispersant oil additives is known in the art as indicated by the following patents.

U.S. Pat. No. 3,316,177 teaches ethylene copolymers of at least 50,000, such as ethylene-propylene, or ethylene-propylene-diene, which are heated to elevated temperatures in the presence of oxygen so as to oxidize the polymer and cause its reaction with maleic anhydride which is present during the oxidation. The resulting polymer can then be reacted with alkylene polyamines.

U.S. Pat. No. 3,326,804 teaches reacting ethylene copolymers with oxygen or ozone, to form a hydroperoxidized polymer which is grafted with maleic anhydride followed by reaction with polyalkylene polyamines. Preferred are ethylene-propylene copolymers, having $M_v$ from 100,000 to 500,000, prepared by Ziegler type catalysts.

U.S. Pat. No. 4,160,739 teaches an ethylene copolymer ($M_v$=10,000 to 200,000) which is grafted, using a free radical technique, with alternating maleic anhydride and a second polymerizable monomer such as methacrylic acid, which materials are reacted with an amine having a single primary, or a single secondary, amine group.

U.S. Pat. No. 4,161,452 relates to graft copolymers wherein the backbone polymer is a polymeric hydrocarbon such as EP copolymer or EPDM ($M_v$=10,000 to 200,000) and the grafted units are the residues of an additional copolymerizable monomer system comprising, e.g., maleic anhydride, and at least one other addition monomer.

U.S. Pat. No. 4,171,273 reacts an ethylene copolymer ($M_v$=10,000 to 100,000) with maleic anhydride in the presence of a free radical initiator and then with mixtures of $C_4$ to $C_{12}$ n-alcohol and amine such as N-aminopropylmorpholine or dimethylamino propyl amine to form a V.I.-dispersant-pour depressant additive.

The following references include disclosures of EP/EPDM polymers of $M_v$ of 700/500,000, also prepared by conventional, e.g., Ziegler catalysts.

U.S. Pat. No. 4,089,794 teaches grafting the ethylene copolymer ($M_n$=700 to 500,000) with maleic anhydride using peroxide in a lubricating oil solution, wherein the grafting is preferably carried out under nitrogen, followed by reaction with polyamine.

U.S. Pat. No. 4,137,185 teaches reacting $C_1$ to $C_{30}$ monocarboxylic acid anhydrides, and dicarboxylic anhydrides, such as acetic anhydride, succinic anhydride, etc., with an ethylene copolymer ($M_n$=700 to 500,000) reacted with maleic anhydride and a polyalkylene polyamine to inhibit cross linking and viscosity increase due to further reaction of any primary amine groups which were initially unreacted. Similar to U.S. Pat. No. 4,137,185 is E.P. Application 295,854 A2, wherein a $C_{12}$ to $C_{18}$ hydrocarbyl substituted succinic anhydride is used to treat the imidized, carboxylic-grated ethylene-alpha-olefin a separate and subsequent reaction step.

U.S. Pat. No. 4,144,181 is similar to U.S. Pat. No. 4,137,185 in that it teaches using a sulfonic acid to inactivate the remaining primary amine groups when a maleic anhydride grafted ethylene-propylene copolymer ($M_n$=700 to 500,00) is reacted with a polyamine.

U.S. Pat. No. 4,219,432 teaches maleic anhydride grafted ethylene copolymer ($M_n$=700 to 500,00) reacted with both a first amine having only one primary group and a second amine having two or more primary groups. More particularly, the grafted copolymer is reacted partially (i.e., between about 10 to 90% conversion) with a tertiary aminoamine compound having one primary amine group, and then fully with an alpha-omega primary diamine having two primary amine groups. Then, in a post-reaction step, the imidized polymer is reacted with an anhydride of an organic acid (e.g., a $C_1$–$C_{30}$ hydrocarbyl substituted carboxylic acid). The treatment of the imidized polymer by reaction with the organic acid anhydride stabilizes the polymer for use as a dispersant/VI improver additive and inhibits viscosity increase of the lubricating oil compositions in which it is used.

U.S. Pat. No. 4,505,834 teaches VI improver/dispersant additives for lubricating oils produced by grafting succinic groups onto an ethylene α-olefin polymer in a hydrogen-treated mineral oil solution, and then reacting the grafted intermediate with an amine having only one primary amine group. The succinic groups are grafted onto the copolymer by reacting the copolymer with maleic acid, anhydride, or acid-ester in the presence of a free radical producing catalyst. The patent particularly discloses that the use of an amine that contains only one primary amine group "prevents the amine from acting as a crosslinking agent between maleic grafted olefin copolymer." (column 3, lines 24–25) The ethylene-alpha-olefin copolymer has a number average molecular weight of about 1,000–500,000 and contains about 30–80 wt. % ethylene units and 20–70 wt. % olefin units, and may optionally contain up to about 10 Wt. % non-conjugated diene units.

U.K. Application 2,055,852 A discloses a process for the production of polymeric dispersant additives and viscosity index improvers for lubricating oils, wherein an ethylene-alpha-olefin copolymer in mineral oil solution is grafted under an inert atmosphere with an ethylenically unsaturated dicarboxylic acid material in the presence of a free radical initiator to provide a grafted copolymer that contains from 2 to 20 carboxyl groups per copolymer molecule, and wherein the grafted copolymer is then imidated by reaction with 0.5 to 1.5 moles of an alkyl hetero-substituted alkylene primary amine per mole of grafted dicarboxylic acid groups. In this process, a portion of the mineral oil is grafted and imidated as well. Lubricating oil compositions containing these additives are said to be viscosity-stable and haze-free. The copolymers which are grafted contain from about 2 to 98 wt. % ethylene and from about 2 to 98 wt. % of one or more $C_3$–$C_{28}$ α-olefins. The copolymers preferably have a crystallinity of less than 25 wt. % and a $M_n$ of about 700 to about 500,000.

E.P. Application 171,167 A2 discloses a process for grafting oil soluble hydrocarbon polymers or copolymers of $M_n$ from 5,000 to 500,000 with an ethylenically unsaturated $C_3$–$C_{10}$ carboxylic acid having 1 to 2 carboxylic acid groups or an anhydride group in the presence of a free radical initiator and a chain stopping agent. A preferred group of polymers are ethylene-alpha-olefin copolymers that contain 15–90 wt. % ethylene and 10–85 wt. % of one or more $C_3$–$C_{28}$ α-olefins. The grafting is accomplished in the solid state, rather than in solution, to avoid grafting the solvent. A VI improver/dispersant may be obtained by dissolving the grafted material in a mineral lubricating oil and reacting it with an amine having 2–60 carbons atoms and 1–12 amine groups. Especially preferred amines have "a single primary amine group, with any other amine groups present being tertiary amine groups. This minimizes cross-linking and becomes particularly important when the polymer has a relatively high degree of acidity, e.g. above about 0.1 meq./g of polymer." (page 17, lines 5–9)

U.S. Pat. No. 4,749,505 discloses a process for the molecular weight degradation of olefin polymers of $M_n$ of from about 5,000 to about 500,000, in which the polymer is heated in the presence of a free radical initiator under inert atmosphere and in the substantial absence of a solvent. Suitable olefin polymers include copolymers of two or more monomers of $C_2$ to $C_{30}$ alpha-olefins. A VI-dispersant additive may be formed from the degraded polymer by grafting the hydrocarbon polymer with an ethylenically unsaturated $C_3$–$C_{10}$ carboxylic acid having 1 or 2 carboxylic acid groups or an anhydride group before, during or after the degradation step, and then reacting the grafted polymer with an amine. Useful amines include mono- and polyamines of about 2–60 carbon atoms and about 1–12 nitrogen atoms. Especially preferred are amines "having a single primary amine group, with an other amine groups present being tertiary amine groups" to inhibit crosslinking. (column 7, lines 16–18)

U.S. Pat. No. 4,863,623 teaches a multifunctional lubricant additive, which acts as a VI improver, a dispersant, and an anti-oxidant in lubricating oil compositions. The multifunctional additive comprises an ethylene copolymer or terpolymer of a $C_3$–$C_{10}$ alpha-monoolefin and optionally a non-conjugated diene or triene that has been grafted with a ethylenically unsaturated carboxylic function, and then further derivatized with an amino-aromatic polyamine compound. The process for grafting the unsaturated carboxylic function, preferably maleic anhydride, onto the copolymer may be a thermal "ene" process or a free radical process, either in solution or in solid form. The ethylene copolymer is oil soluble, substantially linear, and has an average molecular weight from about 5,000 to 500,000. Among the suitable copolymers are ethylene-alpha-olefin copolymers having from about 15–80 mole % ethylene and 20–85 mole % of an alpha-olefin.

E.P. Application 396,297 A1 contains teachings similar to that of the above-described U.S. Pat. No. 4,863,623, with the significant difference being that the polymers subjected to grafting with the carboxylic compound have molecular weights in a lower range, from 300 to 3,500. Two other patents along similar lines to U.S. Pat. No. 4,863,623 are Canadian Patent 2,021,959 and U.S. Pat. No. 5,075,383, both of which are directed to dispersant-antioxidant additives prepared by grafting ethylene-alpha-olefin copolymers with an acylating agent before or after the molecular weight degradation of the copolymer, followed by derivatization of the grafted copolymer with an aromatic polyamine.

The following references include disclosures of lubricating oil additives produced from ethylene-alpha-olefin interpolymers, radically grafted with unsaturated carboxylic compounds, by reaction with amine reactants in the presence of hydrocarbyl-substituted carboxylic acid compounds acting as chain-stoppers:

U.S. Pat. No. 4,557,847 teaches polymeric viscosity index improver-dispersant additives for lubricating oils produced by reacting an ethylene-alpha-olefin copolymer grafted with an ethylenically unsaturated carboxylic material having 1 or 2 carboxylic acid groups or anhydride groups, preferably maleic anhydride, with an alkylene or oxyalkylene amine having at least two primary amine groups and a branched chain acid. The ethylene-alpha-olefin copolymer has a $M_n$ of from about 5,000 to about 500,000. Copolymers containing one or more diolefins are also suitable. The branched chain acid may be of formula RCOOH where R is a hydrocarbyl group containing 20–148 carbon atoms. The grafted copolymer, the amine, and the branched acid may be reacted together, or the amine and branched acid may be reacted to form a pre-reacted product which is then reacted with the grafted copolymer. The specification discloses that "[c]rosslinking between ethylene copolymer molecules is reduced or inhibited since many of the polyamine molecules will have one primary group reacted with a maleic anhydride moiety of the ethylene copolymer, while its other primary group is reacted with the branched chain acid component." (column 2, lines 32–38).

U.S. Pat. No. 4,517,104, which has teachings similar to those in U.S. Pat. No. 4,557,847, discloses a broader range of acid components suitable for use as the co-reactant with the amine. More particularly, the acid component may be a $C_{12}$–$C_{49}$ hydrocarbyl substituted succinic anhydride or acid, a long-chain monocarboxylic acid of formula RCOOH where R is a $C_{50}$–$C_{400}$ hydrocarbyl group, or a long-chain $C_{50}$–$C_{400}$ hydrocarbyl substituted succinic anhydride or acid. Also along similar lines to U.S. Pat. No. 4,517,104 are E.P. Application 352,072 A1, which discloses the use of an acid component comprising a long chain hydrocarbyl substituted dicarboxylic acid material and a short chain hydrocarbyl substituted dicarboxylic acid or anhydride, and E.P. Application 369,674 A1, which discloses a poly-n-butene substituted dicarboxylic acid material of $M_n$ 300–3,000 as the acid-component.

Related disclosures of maleic anhydride grafted, aminated ethylene-propylene polymer viscosity improver-dispersant additives useful in lubricating oil compositions are contained in U.S. Pat. Nos. 4,507,515; 4,632,769; 4,693,838; and 4,707,285.

U.S. Pat. No. 4,668,834 discloses the preparation (via certain metallocene and alumoxane catalyst systems) of ethylene-alpha olefin copolymers and terpolymers having vinylidene-type terminal unsaturation, which are disclosed as being useful as intermediates in epoxy-grafted encapsulation compositions.

U.S. Pat. No. 4,704,491 relates to liquid ethylene alpha-olefin random copolymers, which are useful when hydrogenated, as synthetic lubricant oil. The copolymers are characterized, inter alia, by having 10–85 mol. % ethylene units, 15–90 mol. % alpha-olefin units, $M_n$ of from 300 to 10,000 and a $M_w/M_n$ of not more than 2.5. The patent also indicates that the liquid copolymer can be modified easily since it has a double bond capable of reacting with maleic anhydride, etc., at the molecular chain ends.

Japanese Published Patent Application 87-129,303 A relates to narrow molecular weight distribution ($M_w/M_n$<2.5) ethylene alpha-olefin copolymer waxes containing 85–99 mol. % ethylene, which are disclosed as being useful as dispersing agents, modifiers or materials to produce toners. The copolymers (having crystallinity of from 5–85%) are prepared in the presence of a catalyst system comprising Zr compounds having at least one cycloalkadienyl group and alumoxane.

European Patent 128,046 discloses (co)polyolefin reactor blends of polyethylene and ethylene higher alpha-olefin copolymers prepared by employing described dual-metallocene/alumoxane catalyst systems.

European Patent Publication 129,368 discloses metallocene/alumoxane catalysts useful for the preparation of ethylene homopolymer and ethylene higher alpha-olefin copolymers.

European Patent Application Publication 257,696 A1 relates to a process for dimerizing alpha-olefins using a catalyst comprising certain metallocene/alumoxane systems.

European Patent Publication 305,022 A1 relates to certain synthetic hydrocarbon lubricating oil compositions containing a load-withstanding additive and a liquid ethylene alpha-olefin random copolymer modified by graft copolymerization with an unsaturated carboxylic acid or derivative thereof (e.g., maleic anhydride). The ethylene alpha-olefin copolymers ($M_n$ of 300 to 12,000) are obtained using Ziegler catalysts (e.g., catalyst formed from soluble V compound and an organo aluminum compound), and are grafted in the presence of a free radical initiator.

PCT Published Patent Application WO 88/01626 relates to transition metal compound/alumoxane catalysts for polymerizing alpha-olefins.

SUMMARY OF THE INVENTION

The present invention is directed to gel-free, oil-soluble lubricating oil and fuel oil dispersant additives comprising α-olefin homopolymers, and interpolymers, preferably ethylene α-olefin interpolymers, wherein the number average molecular weight of the polymer is from about 700 to about 10,000 and wherein at least about 30 percent of the polymer chains possess terminal ethenylidene unsaturation, free radically grafted with monounsaturated carboxylic acid producing moieties (preferably acid or anhydride moieties) and further reacted with at least one non-aromatic nucleophilic post-treating reactant selected from (i) amine compounds containing only a single reactive amino group per molecule, (ii) alcohol compounds containing only a single hydroxy group per molecule, (iii) polyamine compounds containing at least two reactive amino groups per molecule, (iv) polyol compounds containing at least two reactive hydroxy groups per molecule, (v) aminoalcohol compounds containing at least one reactive amino group and at least one reactive hydroxy group per molecule, and (vi) mixtures of (i) to (v); provided that when said post-treating reactant includes one or more of (iii), (iv) or (v), the reaction between the grafted polymer and the post-treating reactant is conducted in the presence of sufficient chain-stopping or end-capping co-reactant (C) to ensure that the grafted and post-reacted product mixture is gel-free.

The present invention, for the first time, makes it possible to ensure a higher conversion of the starting polymer material to active dispersant without simultaneously increasing the risk of gelation and other adverse effects, such as viscosity growth, which often accompany the addition of sufficient free radically grafted acid moieties to raise the level of active dispersant in the product mixture to a commercially acceptable level.

The dispersant materials of the invention are different from the prior art because they contain a relatively higher level of active ingredient with a reduced level of cross-linking than would be expected from free radically grafted, post-reacted alpha-olefin dispersant additives. The dispersant additives of the present invention also differ from those of the prior art in that the present dispersant additives optimize the distribution of carboxylic acid producing moieties on the alpha-olefin polymer backbone so as to minimize the amount of unreacted polymer, so as to minimize any tendency toward gelation and cross-linking, and so as to maximize the dispersant properties of the product mixture relative to the cost of its production. In fuels, the additives serve to minimize the degree of carburetor and fuel injector fouling from deposits. In addition, the additives of this invention posses superior viscometric properties The process of this invention permits the preparation of lubricating oil and fuel dispersant additives which are simultaneously characterized by a high active ingredient content (usually at least about 60 wt. %, and up to about 95 wt. %) and by advantageous viscosity properties to permit the additives to be readily handled. In addition, the process of the present invention can produce such dispersant additives in a highly concentrated form as substantially halogen free materials, thereby reducing the corrositivity, processing difficulties and environmental concerns which are associated with halogen-containing lubricating oil additives.

DETAILED DESCRIPTION OF THE INVENTION

Alpha-Olefin Polymer

The polymers employed in this invention are homopolymers or interpolymers of at least one $C_3$ to $C_{28}$ alpha-olefin having the formula $H_2C=CHR^1$ wherein $R^1$ is straight chain or branched chain alkyl radical comprising 1 to 26 carbon atoms and wherein the polymer preferably contains a high degree of terminal ethenylidene, i.e., vinylidene, unsaturation. Preferably, the polymers employed in this invention comprise interpolymers of ethylene and at least one alpha-olefin of the above formula, wherein $R^1$ is alkyl of from 1 to 18 carbon atoms, and more preferably is alkyl of from 1 to 8 carbon atoms. In still other embodiments of this invention, $R^1$ is alkyl of 1 to 2 carbon atoms. Therefore, useful alpha-olefin monomers and comonomers include, for example, propylene, butene-1, hexene-1, octene-1, 4-methylpentene-1, decene-1, dodecene-1, tridecene-1, tetradecene-1, pentadecene-1, hexadecene-1, heptadecene-1, octadecene-1, nonadecene-1, and mixtures thereof (e.g., mixtures of propylene and butene-1, and the like).

Exemplary of such polymers are propylene homopolymers, butene-1 homopolymers, ethylene-propylene copolymers, ethylene-butene-1 copolymers and the like. Preferred polymers are copolymers of ethylene and propylene and ethylene and butene-1.

Optionally, the interpolymers of this invention may contain a minor amount, e.g. 0.5 to 5 mole percent of a $C_4$ to $C_{18}$ non-conjugated diolefin comonomer. However, it is preferred that the polymers of this invention comprise only alpha-olefin homopolymers, interpolymers of alpha-olefin comonomers and interpolymers of ethylene and alpha-olefin comonomers.

The molar ethylene content of the polymers employed in this invention is preferably in the range of between about 20 to about 80 percent, and more preferably between about 30 to about 70 percent. When propylene and/or butene-1 are employed as comonomer(s) with ethylene, the ethylene content of such copolymers is most preferably between about 45 and about 65 percent, although higher or lower ethylene contents may be present.

The polymers employed in this invention generally possess a number average molecular weight of from about 700 to about 10,000 (e.g., from 1,000 to 8,000), preferably from about 800 to 5,500; more preferably of from about 1,000 to 3,000 (e.g., from about 1,500 to about 2,500). Polymers having a number average molecular weight within the range of from about 700 to 5,000 (e.g., 1,000 to 3,000) are particularly useful in the present invention. The number average molecular weight for such polymers can be determined by several known techniques. A convenient method for such determination is by size exclusion chromatography (also known as gel permeation chromatography (GPC)) which additionally provides molecular weight distribution information, see W. W. Yau, J. J. Kirkland and D. D. Bly, "Modern Size Exclusion Liquid Chromatography", John Wiley and Sons, New York, 1979.

Suitable polymers will typically have a narrow molecular weight distribution (MWD), also referred to as polydispersity, as determined by the ratio of weight average molecular weight ($\overline{Mw}$) to number average molecular weight ($\overline{Mn}$). Polymers having a $\overline{Mw}/\overline{Mn}$ of less than 5, preferably less than 4, are most desirable. Suitable polymers have a polydispersity of, for example, from about 1 to about 5.

Consequently, such polymers generally possess an intrinsic viscosity (as measured in tetralin at 135° C.) of between about 0.025 and about 0.9 dl/g, preferably of between about 0.05 and about 0.5 dl/g, most preferably of between about 0.075 and about 0.4 dl/g.

The polymers employed in this invention preferably exhibit a degree of crystallinity such that, when grafted, they are essentially amorphous.

The polymers employed in this invention, which are further characterized in that up to about 95% and more of the polymer chains possess terminal ethenylidene-type unsaturation, may be prepared by polymerizing alpha-olefin monomer, or mixtures of alpha-olefin monomers, or mixtures comprising ethylene and at least one $C_3$ to $C_{28}$ alpha-olefin monomer, in the presence of a catalyst system comprising at least one metallocene (e.g., a cyclopentadienyl-transition metal compound) and an alumoxane compound. Interpolymers of this latter type, which are the preferred interpolymers for use in the invention, may be characterized by the formula POLY-C($R^1$)=$CH_2$ wherein $R^1$ is $C_1$ to $C_{26}$ alkyl, preferably $C_1$ to $C_{18}$ alkyl, more preferably $C_1$ to $C_8$ alkyl, and most preferably $C_1$ to $C_2$ alkyl, (e.g., methyl or ethyl) and wherein POLY represents the polymer chain. The chain length of the $R^1$ alkyl group will vary depending on the comonomer(s) selected for use in the polymerization. A minor amount of the polymer chains can contain terminal ethenyl, i.e., vinyl, unsaturation, i.e. POLY-CH=$CH_2$, and a portion of the polymers can contain internal monounsaturation, e.g. POLY-CH=CH($R^1$), wherein $R^1$ is as defined above.

In the preferred polymers contemplated for use in this invention, at least about 30 percent of the polymer chains possess terminal ethenylidene, i.e., vinylidene, unsaturation. Preferably at least about 50 percent, more preferably at least about 60 percent, and most preferably at least about 75 percent (e.g. 75–98%), of such polymer chains exhibit terminal ethenylidene unsaturation. The percentage of polymer chains exhibiting terminal ethenylidene unsaturation may be determined by FTIR spectroscopic analysis, titration, or $C^{13}$NMR.

The preferred terminally unsaturated interpolymer to be used in this invention may be prepared as described in U.S. Pat. No. 4,668,834, in European Patent Publications 128,046 and 129,368, in U.S. Ser. No. 728,111, filed Apr. 29, 1985, and in U.S. Ser. No. 93,460, filed Sep. 10, 1987, the disclosures of all of which are hereby incorporated by reference in their entirety. Preferred polymers to be used in this invention also may be prepared as described in commonly assigned application Ser. No. 992,871 (entitled "Amorphous Olefin Polymers, Copolymers, Methods of Preparation and Derivatives Thereof"—Docket No. PT-915); Ser. No. 992,690 (entitled "Dilute Feed Process for the Polymerization of Ethylene/α-Olefin Copolymer Using Metallocene Catalyst System"—Docket No. PT-937) (which was abandoned in favor of continuing application U.S. Ser. No. 652,185, filed May 23, 1996); and Ser. No. 992,192 (entitled "Polymers Derived From Ethylene and 1-Butene for Use in the Preparation of Lubricant Dispersant Additives"—Docket No. PT-944) (which was abandoned in favor of continuing application U.S. Ser. No. 445,574, which is now U.S. Pat. No. 5,498,809) which have been filed on even date herewith, and the disclosures of which have been incorporated herein by reference in their entirety.

The preferred interpolymers can be prepared by polymerizing monomer mixtures comprising ethylene in combination with other monomers such as alpha-olefins having from 3 to 28 carbon atoms (and preferably from 3 to 4 carbon atoms, i.e., propylene, butene-1, and mixtures thereof) in the presence of a catalyst system comprising at least one metallocene (e.g., a cyclopentadienyl-transition metal compound) and an alumoxane compound. The comonomer content can be controlled through the selection of the metallocene catalyst component and by controlling the partial pressure of the various monomers.

The catalysts employed in the production of the preferred polymers are organometallic coordination compounds which are cyclopentadienyl derivatives of a Group 4b metal of the Periodic Table of the Elements (56th Edition of Handbook of Chemistry and Physics, CRC Press [1975]) and include mono, di and tricyclopentadienyls and their derivatives of the transition metals. Particularly desirable are the metallocenes of a Group 4b metal such as titanium, zirconium, and hafnium. The alumoxanes employed in forming the reaction product with the metallocenes are themselves the reaction products of an aluminum trialkyl with water.

In general, at least one metallocene compound is employed in the formation of the catalyst. As indicated, supra, metallocene is a metal derivative of a cyclopentadiene. The metallocenes usefully employed in accordance with this invention contain at least one cyclopentadiene ring. The metal is selected from the Group 4b, preferably titanium, zirconium, and hafnium, and most preferably hafnium and zirconium. The cyclopentadienyl ring can be unsubstituted or contain one or more substituents (e.g., from 1 to 5 substituents) such as, for example, a hydrocarbyl substituent (e.g., up to 5 $C_1$ to $C_5$ hydrocarbyl substituents) or other substituents, e.g. such as, for example, a trialkyl silyl substituent. The metallocene can contain one, two, or three cyclopentadienyl rings; however, two rings are preferred.

Useful metallocenes can be represented by the general formulas:

   I.

wherein Cp is a cyclopentadienyl ring, M is a Group 4b transition metal, R is a hydrocarbyl group or hydrocarboxy group having from 1 to 20 carbon atoms, X is a halogen, and m is a whole number from 1 to 3, n is a whole number from 0 to 3, and q is a whole number from 0 to 3.

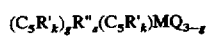   II.

and

   III.

wherein ($C_5R'_k$) is a cyclopentadienyl or substituted cyclopentadienyl, each R' is the same or different and is hydrogen or a hydrocarbyl radical such as alkyl, alkenyl, aryl, alkylaryl, or arylalkyl radical containing from 1 to 20 carbon atoms, a silicon containing hydrocarbyl radical, or hydrocarbyl radicals wherein two carbon atoms are joined together to form a $C_4$–$C_6$ ring, R" is a $C_1$–$C_4$ alkylene radical, a dialkyl germanium or silicon, or a alkyl phosphine or amine radical bridging two ($C_5R'_k$) rings, Q is a hydrocarbyl radical such as aryl, alkyl, alkenyl, alkylaryl, or aryl alkyl radical having from 1–20 carbon atoms, hydrocarboxy radical having from 1–20 carbon atoms or halogen and can be the same or different from each other, Q' is an alkylidene radical having from 1 to about 20 carbon atoms, s is 0 or 1, g is 0, 1 or 2, s is 0 when g is 0, k is 4 when s is 1, and k is 5 when s is 0, and M is as defined above. Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like. Exemplary silicon containing hydrocarbyl radicals are trimethylsilyl, triethylsilyl and triphenylsilyl. Exemplary halogen atoms include chlorine, bromine, fluorine and iodine and of these halogen atoms, chlorine is preferred. Exemplary hydrocarboxy radicals are methoxy ethoxy, butoxy, amyloxy and the like. Exemplary of the alkylidene radicals is methylidene, ethylidene and propylidene.

Illustrative, but non-limiting examples of the metallocenes represented by formula I are dialkyl metallocenes such as bis(cyclopentadienyl)titanium dimethyl, bis (cyclopentadienyl)titanium diphenyl, bis(cyclopentadienyl) zirconium dimethyl, bis(cyclopentadienyl)zirconium diphenyl, bis(cyclopentadienyl)hafnium dimethyl and diphenyl, bis(cyclopentadienyl)titanium dineopentyl, bis (cyclopentadienyl)zirconium di-neopentyl, bis (cyclopentadienyl)titanium dibenzyl, bis(cyclopentadienyl) zirconium dibenzyl, bis(cyclopentadienyl)vanadium dimethyl; the mono alkyl metallocenes such as bis (cyclopentadienyl)titanium methyl chloride, bis (cyclopentadienyl)titanium ethyl chloride bis (cyclopentadienyl)titanium phenyl chloride, bis (cyclopentadienyl)zirconium hydrochloride, bis (cyclopentadienyl)zirconium methyl chloride, bis (cyclopentadienyl)zirconium ethyl chloride, bis (cyclopentadienyl)zirconium phenyl chloride, bis (cyclopentadienyl)titanium methyl bromide, bis (cyclopentadienyl)titanium methyl iodide, bis (cyclopentadienyl)titanium ethyl bromide, bis (cyclopentadienyl)titanium ethyl iodide, bis (cyclopentadienyl)titanium phenyl bromide, bis (cyclopentadienyl)titanium phenyl iodide, bis (cyclopentadienyl)zirconium methyl bromide, bis (cyclopentadienyl)zirconium methyl iodide, bis (cyclopentadienyl)zirconium ethyl bromide, bis (cyclopentadienyl)zirconium ethyl iodide, bis (cyclopentadienyl)zirconium phenyl bromide, bis (cyclopentadienyl)zirconium phenyl iodide; the trialkyl metallocenes such as cyclopentadienyltitanium trimethyl, cyclopentadienyl zirconium triphenyl, and cyclopentadienyl zirconium trineopentyl, cyclopentadienylzirconium trimethyl, cyclopentadienylhafnium triphenyl, cyclopentadienylhafnium trineopentyl, and cyclopentadienylhafnium trimethyl.

Illustrative, but non-limiting examples of II and III metallocenes which can be usefully employed are monocyclopentadienyls titanocenes such as, pentamethylcyclopentadienyl titanium trichloride, pentaethylcyclopentadienyl titanium trichloride, bis(pentamethylcyclopentadienyl) titanium diphenyl, the carbene represented by the formula bis(cyclopentadienyl)titanium=$CH_2$ and derivatives of this reagent such as bis(cyclopentadienyl)Ti=$CH_2$·Al($CH_3$)$_3$, ($Cp_2TiCH_2$)$_2$, $Cp_2TiCH_2CH(CH_3)CH_2$, $Cp_2Ti$—$CH_2CH_2CH_2$; substituted bis(Cp)Ti(IV) compounds such as bis(indenyl)titanium diphenyl or dichloride, bis (methylcyclopentadienyl)-titanium diphenyl or dihalides; dialkyl, trialkyl, tetra-alkyl and penta-alkyl cyclopentadienyl titanium compounds such as bis(1,2-dimethylcyclopentadienyl)titanium diphenyl or dichloride, bis(1,2-diethylcyclopentadienyl)titanium diphenyl or dichloride and other dihalide complexes; silicon, phosphine, amine or carbon bridged cyclopentadiene complexes, such as dimethylsilyldicyclopentadienyl titanium diphenyl or dichloride, methyl phosphine dicyclopentadienyl titanium diphenyl or dichloride, methylenedicyclopentadienyl titanium diphenyl or dichloride and other complexes described by formulae II and III.

Illustrative but non-limiting examples of the zirconocenes of Formulas II and III which can be usefully employed are, pentamethylcyclopentadienyl zirconium trichloride, pentaethylcyclopentadienyl zirconium trichloride, the alkyl substituted cyclopentadienes, such as bis (ethylcyclopentadienyl)zirconium dimethyl, bis (betaphenylpropylcyclopentadienyl)zirconium dimethyl, bis (methylcyclopentadienyl)zirconium dimethyl, bis(n-butylcyclopentadienyl)zirconium dimethyl bis (cyclohexylmethylcyclopentadienyl)zirconium dimethyl bis (n-octylcyclopentadienyl)zirconium dimethyl, and haloalkyl and dihydride, and dihalide complexes of the above; dialkyl, trialkyl, tetra-alkyl, and penta-alkyl cyclopentadienes, such as bis(pentamethylcyclopentadienyl)zirconium diphenyl, bis(pentamethylcyclopentadienyl)zirconium dimethyl, bis (1,2-dimethylcyclopentadienyl)zirconium dimethyl and mono and dihalide and hydride complexes of the above; silicon, phosphorus, and carbon bridged cyclopentadiene complexes such as dimethylsilyldicyclopentadienyl zirconium dimethyl, methyl halide or dihalide, and methylene dicyclopentadienyl zirconium dimethyl, methyl halide, or dihalide. Mono, di and trisilyl substituted cyclopentadienyl compounds such as bis(trimethylsilylcyclopentadienyl) zirconium dichloride and dimethyl bis(1,3-di-trimethylsilylcyclopentadienyl)zirconium dichloride and dimethyl and bis(1,2,4-tri-trimethylsilylcyclopentadienyl) zirconium dichloride and dimethyl. Carbenes represented by the formulae $Cp_2Zr$=$CH_2P(C_6H_5)_2CH_3$, and derivatives of these compounds such as $Cp_2ZrCH_2CH(CH_3)CH_2$.

Mixed cyclopentadienyl metallocene compounds such as cyclopentadienyl (pentamethyl cyclopentadienyl)zirconium dichloride, (1,3-di-trimethylsilylcyclopentadienyl) (pentamethylcyclopentadienyl)zirconium dichloride, and cyclopentadienyl(indenyl)zirconium dichloride can be employed.

Most preferably, the polymers used in this invention are substantially free of ethylene homopolymer. Bis (cyclopentadienyl)hafnium dichloride, bis (cyclopentadienyl)hafnium; dimethyl, bis(cyclopentadienyl) vanadium dichloride and the like are illustrative of other metallocenes.

Some preferred metallocenes are bis(cyclopentadienyl) zirconium dimethyl; bis(cyclopentadienyl)zirconium dichloride; bis(cyclopenta-dienyl)titanium dichloride; bis (methylcyclopentadienyl)zirconium dichloride; bis (methylcyclopentadienyl)titanium dichloride; bis(n-butylcyclopentadienyl)zirconium dichloride; dimethylsilyldicyclopentadienyl zirconium dichloride; bist-rimethylsilycyclopentadienyl zirconium dichloride; and dimethylsilyldicyclopentadienyl titanium dichloride; bis (indenyl)zirconium dichloride; bis-(4,5,6,7-tetrahydroindenyl)zirconium dichloride; the racemic and/or meso isomer of 1,2-ethylene-bridged bis-(4,5,6,7-tetrahydroindenyl)zirconium dichloride; the racemic and/or meso isomer of 1,1-dimethylsilyl-bridged bis(4,5,6,7-tetrahydroindenyl)zirconium dichloride; and the racemic and/or meso isomer of 1,1-dimethylsilyl-bridged bis (methylcyclopentadienyl)zirconium dichloride.

The alumoxane compounds useful in the polymerization process may be cyclic or linear. Cyclic alumoxanes may be represented by the general formula (R—Al—O)$_n$ while linear alumoxanes may be represented by the general formula R(R—Al—O)$_n$'AlR$_2$. In the general formula R is a $C_1$–$C_5$ alkyl group such as, for example, methyl, ethyl, propyl, butyl and pentyl, n is an integer of from 3 to 20, and n' is an integer from 1 to about 20. Preferably, R is methyl and n and n' are 4–18. Generally, in the preparation of alumoxanes from, for example, aluminum trimethyl and water, a mixture of the linear and cyclic compounds is obtained.

The alumoxane can be prepared in various ways. Preferably, they are prepared by contacting water with a solution of aluminum trialkyl, such as, for examples, aluminum trimethyl, in a suitable organic solvent such as toluene or an aliphatic hydrocarbon. For example, the aluminum alkyl is treated with water in the form of a moist solvent. In an alternative method, the aluminum alkyl such as aluminum trimethyl can be desirably contacted with a hydrated salt such as hydrated copper sulfate or ferrous sulfate. Preferably, the alumoxane is prepared in the presence of a hydrated ferrous sulfate. The method comprises treating a dilute solution of aluminum trimethyl in, for example, toluene, with ferrous sulfate represented by the general formula $FeSO_4 \cdot 7H_2O$. The ratio of ferrous sulfate to aluminum trimethyl is desirably about 1 mole of ferrous sulfate for 6 to 7 moles of aluminum trimethyl. The reaction is evidenced by the evolution of methane.

The mole ratio of aluminum in the alumoxane to total metal in the metallocenes which can be usefully employed can be in the range of about 0.5:1 to about 1000:1, and desirably about 1:1 to about 100:1. Preferably, the mole ratio will be in the range of 50:1 to about 5:1 and most preferably 20:1 to 5:1.

The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

Polymerization is generally conducted at temperatures ranging between about 20° and about 300° C., preferably between about 30° and about 200° C. Reaction time is not critical and may vary from several hours or more to several minutes or less, depending upon factors such as reaction temperature, the monomers to be copolymerized, and the like. One of ordinary skill in the art may readily obtain the optimum reaction time for a given set of reaction parameters by routine experimentation.

The catalyst systems described herein are suitable for the polymerization of olefins in solution over a wide range of pressures. Preferably, the polymerization will be completed at a pressure of from about 10 to about 3,000 bar, and generally at a pressure within the range from about 40 bar to about 2,000 bar, and most preferably, the polymerization will be completed at a pressure within the range from about 50 bar to about 1,500 bar.

After polymerization and, optionally, deactivation of the catalyst (e.g., by conventional techniques such as contacting the polymerization reaction medium with water or an alcohol, such as methanol, propanol, isopropanol, etc., or cooling or flashing the medium to terminate the polymerization reaction), the product polymer can be recovered by processes well known in the art. Any excess reactants may be flashed off from the polymer.

The polymerization may be conducted employing liquid monomer, such as liquid propylene, or mixtures of liquid monomers (such as mixtures of liquid propylene and 1-butene, as the reaction medium. Alternatively, polymerization may be accomplished in the presence of a hydrocarbon inert to the polymerization such as butane, pentane, isopentane, hexane, isooctane, decane, toluene, xylene, and the like.

In those situations wherein the molecular weight of the polymer product that would be produced at a given set of operating conditions is higher than desired, any of the techniques known in the prior art for control of molecular weight, such as the use of hydrogen and/or polymerization temperature control, may be used in the process of this invention. If so desired, the polymerization may be carried out in the presence of hydrogen to lower the polymer molecular weight. Care should be taken, however, to assure that terminal ethenylidene unsaturation is not reduced below the preferred level of at least about 30 percent of the polymer chains.

However, since the preferred polymers are reactive polymers possessing ethenylidene-type terminal unsaturation, it is preferred to prepare the polymers in the substantial absence of added $H_2$ gas, that is, the absence of $H_2$ gas added in amounts effective to substantially reduce the polymer molecular weight. More preferably, the polymerizations will be conducted employing less than 5 wppm, and more preferably less than 1 wppm, of added $H_2$ gas, based on the moles of the ethylene monomer charged to the polymerization zone.

When carrying out the polymerization in a batch-type fashion, the reaction diluent (if any), ethylene and alpha-olefin comonomer(s) are charged at appropriate ratios to a suitable reactor. Care must be taken that all ingredients are dry, with the reactants typically being passed through molecular sieves or other drying means prior to their introduction into the reactor. Subsequently, either the catalyst and then the cocatalyst, or first the cocatalyst and then the catalyst are introduced while agitating the reaction mixture, thereby causing polymerization to commence. Alternatively, the catalyst and cocatalyst may be premixed in a solvent and then charged to the reactor. As polymer is being formed, additional monomers may be added to the reactor. Upon completion of the reaction, unreacted monomer and solvent are either flashed or distilled off, if necessary by vacuum, and the low molecular weight copolymer withdrawn from the reactor.

The polymerization may be conducted in a continuous manner by simultaneously feeding the reaction diluent (if employed), monomers, catalyst and cocatalyst to a reactor and withdrawing solvent, unreacted monomer and polymer from the reactor so as to allow a residence time of ingredients long enough for forming polymer of the desired molecular weight and separating the polymer from the reaction mixture.

Preparation of Free-Radically Grafted Alpha-Olefin Polymer

In accordance with this invention, the alpha-olefin polymer is reacted with monounsaturated carboxylic reactant to graft acid producing moieties, i.e., acid, anhydride or acid ester, moieties onto the polymer backbone. The monounsaturated carboxylic reactants suitable for use comprise at least one member selected from the group consisting of (i) monounsaturated $C_4$ to $C_{10}$ dicarboxylic acid wherein (a) the carboxyl groups are vicinyl, (i.e. located on adjacent carbon atoms) and (b) at least one, preferably both, of said adjacent carbon atoms are part of said monounsaturation; (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated with the carboxy group, i.e. of the structure

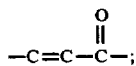

and (iv) derivatives of (iii) such as $C_1$ to $C_5$ alcohol derived mono- or diesters of (iii). Upon reaction with the polymer, the monounsaturation of the monounsaturated carboxylic reactant becomes saturated. Thus, for example, polymer graft reacted with maleic anhydride becomes polymer substituted succinic anhydride, and polymer graft reacted with acrylic acid becomes polymer substituted propionic acid.

The monounsaturated carboxylic reactant, preferably maleic anhydride, typically will be used in an amount ranging from about 0.01 percent to about 10 percent, preferably 0.1 to 2.0 percent, based on the weight of the polymer.

Normally, not all of the polymer reacts with the monounsaturated carboxylic reactant and the reaction mixture will contain unreacted polymer. The unreacted polymer typically is not removed from the reaction mixture (because such removal is difficult and would be commercially infeasible) and the product mixture, stripped of any monounsaturated carboxylic reactant, is employed for further reaction with at least one nucleophilic reactant, i.e., amine, alcohol or aminoalcohol, and sometimes with end-capping reactant, as described more fully hereinafter, to make the dispersant additives of this invention.

Characterization of the average number of moles of monounsaturated carboxylic reactant which have reacted per mole of polymer charged to the reaction (whether it has undergone reaction or not) is defined herein as functionality, and such functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polymer contained in the resulting product mixture can be subsequently modified, i.e. increased or decreased by techniques known in the art, such modifications do not alter functionality as defined above. The terms "grafted ethylene-alpha-olefin polymer" or "grafted olefin polymers" or the like, are intended to refer to the product mixture whether it has undergone such modification or not.

Accordingly, the functionality of the alpha-olefin polymer, which has been graft reacted with the monounsaturated carboxylic reactant, will be typically at least about 0.5, preferably at least about 0.8, and most preferably at least about 0.9 and will vary typically from about 0.5 to about 5 (e.g., 0.6 to 4), preferably from about 0.9 to about 3.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, etc.

The polymer can be reacted with the mono-unsaturated carboxylic reactant by a variety of methods. For example, the polymer, in solution or in solid form, may be grafted with the monounsaturated carboxylic reactant in the presence of a free-radical initiator. When performed in solution, the grafting takes place at an elevated temperature in the range of about 100° C. to 260° C., preferably about 120° C. to about 240° C. Preferably free-radical initiated grafting would be accomplished in a mineral lubricating oil solution containing, e.g. 1 to 50, preferably 5 to 30 wt. % polymer based on the initial total oil solution.

The free-radical initiators which may be used are peroxides, hydroperoxides, and azo compounds, preferably those which have a boiling point greater than about 100° C. and decompose thermally within the grafting temperature range to provide free radicals. Representative of these free-radical initiators are azobutyronitrile, 2,5-dimethylhex-3-ene-2,5-bis-tertiarybutyl peroxide and dicumene peroxide. The initiator, when used, generally is used in an amount of between about 0.005% and about 1% by weight based on the weight of the reaction mixture solution.

Typically, the aforesaid monounsaturated carboxylic reactant material and free-radical initiator are used in a weight percent ratio range of about 1.0:1 to 30:1, preferably 3.0:1 to 6:1. The grafting is preferably carried out in an inert atmosphere, such as under nitrogen blanketing. The resulting grafted polymer is characterized by having carboxylic acid (or anhydride) moieties randomly attached along the polymer chains; it being understood, of course, that some of the polymer chains remain ungrafted. In the solid or melt process for forming a graft polymer, the unsaturated carboxylic reactant with the optional use of a radical initiator is grafted on molten copolymer using masticating or shearing equipment. The temperature of the molten material in this process may range from about 150°–400° C. Processes for free-radically grafting alpha-olefin polymers are described, for example, in U.S. Pat. Nos. 4,505,834; 4,749,504 and 4,863,623; and in U.K. Published Patent Application G.B. 2,055,852 A, the disclosures of which are incorporated herein by reference. Methods for extruder grafting are disclosed in commonly assigned U.S. Ser. No. 989,289, filed on Dec. 11, 1992, entitled "Multiple Reaction Process In Melt Processing Equipment" (Docket Ref. No.: E-296), the disclosure of which is hereby incorporated by reference.

In an alternative method of reacting the alpha-olefin polymer with the monounsaturated carboxylic reactant, the polymer is first halogenated, e.g., chlorinated or brominated, to about 1 to 8 wt. %, preferably 3 to 7 wt. % chlorine, or bromine, based on the weight of polymer, by passing the chlorine or bromine through the polymer at a temperature of 60° to 250° C., preferably 110° to 160° C., e.g., 120° to 140° C., for about 0.5 to 10, preferably 1 to 7 hours. The halogenated polymer is then reacted with sufficient monounsaturated carboxylic reactant at 100° to 250° C., usually about 180° C. to 235° C., for about 0.5 to 10, e.g., 3 to 8 hours, such that the product obtained will contain the desired number of moles of the monounsaturated carboxylic reactant per mole of the halogenated polymer. Processes of this general type are taught in U.S. Pat. Nos. 3,087,436; 3,172, 892; 3,272,746 and others. Alternatively, the polymer and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

In this process, the selected polymer, monounsaturated carboxylic reactant, and free-radical initiator are contacted for a time and under conditions effective to form the desired alpha-olefin polymer substituted mono- or dicarboxylic acid material. Generally, the polymer, monounsaturated carboxylic reactant, and free-radical initiator will be contacted in a polymer to unsaturated carboxylic reactant mole ratio usually from about 1:1 to 1:5, at an elevated temperature, generally from about 100° to 260° C., preferably from about 120° to 240° C. The reaction will be generally carried out, with stirring for a time of from about 1 to 20 hours, preferably from about 2 to 6 hours. The reaction is preferably conducted in the substantial absence of $O_2$ and water (to avoid competing side reactions), and to this end can be conducted in an atmosphere of dry $N_2$ gas or other gas inert under the reaction conditions. The reactants can be charged separately or together as a mixture to the reaction zone, and the reaction can be carried out continuously, semi-continuously or batchwise. Although not generally necessary, the reaction can be carried out in the presence of a liquid diluent or solvent, e.g., a hydrocarbon diluent such as mineral lubricating oil, toluene, xylene, dichlorobenzene and the like. The polymer substituted mono- or dicarboxylic acid material thus formed can be recovered from the liquid reaction mixture, e.g., after stripping the reaction mixture, if desired, with an inert gas such as $N_2$ to remove unreacted unsaturated carboxylic reactant.

The reaction product mixture thereby obtained has been surprisingly found to have a substantially reduced content of sediment or other solid by-products as impurities and can be employed, without filtration, centrifugation, clarification, phase separation or other conventional product purification treatments, as intermediate in the preparation of dispersant additive products for use in lubricating oils, as will be described more completely hereinafter.

The preferred reaction product mixture is prepared either by free-radically grafting ethylene-alpha-olefin polymer with mono- or dicarboxylic acid material. Therefore, the preferred reaction product mixture is further improved by being substantially free of chlorine, that is, by having a chlorine content of less than about 25 ppm by weight, preferably less than about 10 ppm by weight.

It will be understood that one aspect of this invention is the ability to control, or at least to favorably alter, the statistical distribution of carboxylic acid (anhydride) substituents on the different polymer chains of the alpha-olefin polymer. For example, assuming a random free-radical grafting of maleic anhydride onto a copolymer of ethylene-1-butene (having a number average degree of polymerization of 37.5, a number average molecular weight of 1400, an ethylene content of 50 wt. %, and an average of at least 30% of its polymer chains containing terminal ethenylidene unsaturation), the number fraction ($P_n$) and weight fraction ($P_w$) of chains with "n" grafted anhydride groups, given that there are an average of "m" anhydride groups per chain, are illustrated below in Tables I (m=1), II (m=2), III (m=3), IV (m=4) and V (m=5). Table VI (m=2) illustrates the results obtained using the thermal "ene" reaction to add one anhydride group to the end of each copolymer chain, followed by free-radical grafting.

TABLE I

| (m = 1) | | |
|---|---|---|
| n | $P_n$ | $P_w$ |
| 0 | 0.5000 | 0.2433 |
| 1 | 0.2500 | 0.2500 |
| 2 | 0.1250 | 0.1892 |
| 3 | 0.0625 | 0.1267 |
| 4 | 0.0313 | 0.0794 |
| 5 | 0.0156 | 0.0477 |
| 6 | 0.0078 | 0.0279 |
| 7 | 0.0039 | 0.0159 |
| 8 | 0.0020 | 0.0090 |

TABLE II

| (m = 2) | | |
|---|---|---|
| n | $P_n$ | $P_w$ |
| 0 | 0.3333 | 0.1052 |
| 1 | 0.2222 | 0.1462 |
| 2 | 0.1481 | 0.1481 |
| 3 | 0.0988 | 0.1326 |
| 4 | 0.0658 | 0.1109 |
| 5 | 0.0439 | 0.0890 |
| 6 | 0.0293 | 0.0693 |
| 7 | 0.0195 | 0.0529 |
| 8 | 0.0130 | 0.0397 |

TABLE III

| (m = 3) | | |
|---|---|---|
| n | $P_n$ | $P_w$ |
| 0 | 0.2500 | 0.0575 |
| 1 | 0.1875 | 0.0913 |
| 2 | 0.1406 | 0.1045 |
| 3 | 0.1055 | 0.1055 |
| 4 | 0.0791 | 0.0994 |
| 5 | 0.0593 | 0.0898 |
| 6 | 0.0445 | 0.0787 |
| 7 | 0.0334 | 0.0676 |
| 8 | 0.0250 | 0.0571 |

TABLE IV

| (m = 4) | | |
|---|---|---|
| n | $P_n$ | $P_w$ |
| 0 | 0.2 | 0.035733 |
| 1 | 0.16 | 0.06144 |
| 2 | 0.128 | 0.075435 |
| 3 | 0.1024 | 0.081374 |
| 4 | 0.08192 | 0.08192 |
| 5 | 0.065536 | 0.078993 |
| 6 | 0.052429 | 0.07396 |
| 7 | 0.041943 | 0.06778 |
| 8 | 0.033554 | 0.061114 |

TABLE V

| (m = 5) | | |
|---|---|---|
| n | $P_n$ | $P_w$ |
| 0 | 0.166667 | 0.024074 |
| 1 | 0.138889 | 0.043827 |
| 2 | 0.115741 | 0.056327 |
| 3 | 0.096451 | 0.063443 |
| 4 | 0.080376 | 0.066622 |
| 5 | 0.06698 | 0.06698 |
| 6 | 0.055816 | 0.065367 |
| 7 | 0.046514 | 0.062432 |
| 8 | 0.038761 | 0.058659 |

TABLE VI

| (m = 2) | | |
|---|---|---|
| n | $P_n$ | $P_w$ |
| 0 | 0 | 0 |
| 1 | 0.5 | 0.243333 |
| 2 | 0.25 | 0.25 |
| 3 | 0.125 | 0.189167 |
| 4 | 0.0625 | 0.126667 |
| 5 | 0.03125 | 0.079375 |
| 6 | 0.015625 | 0.047708 |
| 7 | 0.007813 | 0.027865 |
| 8 | 0.003906 | 0.015938 |

Referring to Tables I–V, it can be seen that randomly grafting (by free-radical initiation) at a level below average of 1 anhydride group per polymer chain (m<1) would reduce the percent of polyfunctional gelable product, but it would also significantly increase the level of unreacted polymer. This, of course, would "waste" most of the starting polymer as diluent. Similarly, while grafting an average of more than 3 anhydride groups per polymer chain (m>3) would greatly reduce the amount of "wasted" (unreacted) polymer, it would unduly increase the amount of gelable product. Referring to Table VI, it can be seen that when one anhydride group is added to the end of the chain of the alpha-olefin polymer by first conducting the thermal "ene" reaction, and then additional anhydride groups are grafted randomly along the polymer chains by subjecting the polymer to free-radical grafting, there will be few, if any, unfunctionalized polymer chains, as well as fewer highly functionalized chains than when the polymer is subjected only to free-radical grafting. Thus, using a combination of "ene" reaction and free radical grafting will result in less wasted polymer, while simultaneously reducing the likelihood of gel formation.

However, even with the increased yields of alpha-olefin polymer substituted with carboxylic acid producing material contemplated herein, the reaction product mixture comprising the desired grafted alpha-olefin polymer (e.g., ethylene-propylene polymer-substituted with succinic anhydride) formed by the process of this invention generally will contain some unreacted polymer, (that is, polymer which is unsubstituted by carboxylic acid producing moieties). Generally, the concentration of unreacted polymer will be less than about 40 wt. % (e.g., from 5 to 35 wt. %), more preferably less than about 30 wt. % (e.g. from 10 to 25 wt. %), and even more preferably less than about 25 wt. %.

It will be understood that the alpha-olefin polymers of this invention which are charged to the reaction zone can be charged alone or together with (e.g., in admixture with) other polyalkenes derived from alkenes having from 1 to 20 carbon atoms (butene, pentene, octene, decene, dodecene, tetradodecene and the like) and homopolymers of $C_3$ to $C_{10}$, e.g., $C_2$ to $C_5$, monoolefins, and copolymers of $C_2$ to $C_{10}$, e.g., $C_2$ to $C_5$, monoolefins, said additional polymer having a number average molecular weight of at least about 900, and a molecular weight distribution of less than about 4.0, preferably less than about 3.0 (e.g., from 1.2 to 2.8). Preferred such additional olefin polymers comprise a major molar amount of $C_2$ to $C_{10}$, e.g. $C_2$ to $C_5$ monoolefin. Such olefins include ethylene, propylene, butylene, isobutylene, pentene, octene-1, styrene, etc. Exemplary of the additionally charged homopolymers is polypropylene, polyisobutylene, and poly-n-butene the like as well as interpolymers of two or more of such olefins such as copolymers of: ethylene and propylene (prepared by conventional methods other than as described above for the preferred ethylene alpha-olefin copolymers employed in this invention, that is, ethylene-propylene copolymers which are substantially saturated, wherein less than about 10 wt. % of the polymer chains contain ethylenic unsaturation); butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; etc. The additional such olefin polymers charged to the reaction will usually have number average molecular weights of at least about 700, more generally within the range 1200 and about 5,000, more usually between about 1500 and about 4,000. Particularly useful such additional olefin polymers have number average molecular eights within the range of about 1500 and about 3,000 with approximately one double bond per chain. An especially useful additional such polymer is polyisobutylene. Preferred are mixtures of such polyisobutylene with ethylene-propylene copolymers wherein at least 30 wt. % of the copolymers chains contain terminal ethenylidene monounsaturation as described above.

The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York 1979.

Nucleophilic Post-Treating Reactants

The alpha-olefin polymer substituted with carboxylic acid producing moieties, i.e., acid, anhydride or ester moieties, prepared as described above, can be contacted with a suitable nucleophilic post-treating reactant to form the novel dispersants of this invention.

Suitable nucleophilic post-treating reactants include, for example, (i) amine compounds containing only a single reactive amino group per molecule, (ii) alcohol compounds containing only a single hydroxy group per molecule, (iii) polyamine compounds containing at least two reactive amino groups per molecule, (iv) polyol compounds containing at least two reactive hydroxy groups per molecule, (v) aminoalcohol compounds containing at least one reactive amino group and at least one reactive hydroxy group per molecule, and (vi) mixtures of (i) to (v); provided that when the post-treating reactant includes one or more of (iii), (iv) or (v), the reaction between the alpha-olefin polymer substituted with carboxylic acid producing moieties and the nucleophilic post-treating reactant must be conducted in the presence of sufficient chain-stopping or end-capping co-reactant, such as a monoreactive amine or alcohol, or a $C_{12}$–$C_{400}$ hydrocarbyl substituted succinic acid or anhydride, to ensure that the grafted and post-reacted product mixture is gel-free.

The post-treating reactants of group (i), i.e. the amine compounds having a single reactive amino group, generally comprise from 2 to about 60, preferably 2 to 40 (e.g., 3 to 20), total carbon atoms and about 1 to 12, preferably 2 to 12, and most preferably 2 to 6 nitrogen atoms in the molecule. These amines may be hydrocarbyl amines or may be hydrocarbyl amines including other groups, e.g., alkoxy groups, amide groups, nitrile, imidazoline groups, morpholine groups and the like. The amines may contain only one reactive (primary or secondary) amino group, and no other reactive groups may be present. As used in this disclosure, the term "reactive groups" is meant to describe nucleophilic groups, such as primary or secondary amino groups or hydroxy groups, which may react with the carboxylic acid producing moieties attached to the alpha-olefin polymer, e.g., to for ester, amide, imide, oxazoline, etc., linkages. By using an amine having only a single reactive group as the nucleophilic reactant, cross-linking between the carboxylic acid (anhydride or ester) groups of the grafted alpha-olefin polymer will be avoided. Polyamines containing a single primary amino group and 1 or more tertiary amino groups, such as N-(3-aminopropyl)morpholine, are the preferred amines of group (i).

Non-limiting examples of suitable group (i) amine compounds include N-(2-aminoethyl)morpholine; N,N-dimethylethylenediamine; N,N-diethylethylenediamine; N,N-dimethyl-1,3-propanediamine; N,N-diethyl-1,3-propanediamine; 4-aminomorpholine; 4-aminopyridine; N-(2-aminoethyl)piperidine; N-(2,-aminoethyl)oxazoline; N,N-dimethyl-1,3-propane diamine; N,N-dibutyl ethylenediame; N-(3-aminopropyl) morpholine; and N-(aminomethyl)pyridine.

The post-treating reactants in group (ii), i.e., alcohol compounds having a single reactive hydroxy group per molecule, generally comprise from 4 to about 8 carbon atoms and include, for example, $C_4$–$C_8$ aliphatic alcohols such as butanol, pentanol and hexanol. The use of alcohols having less than 4 carbon atoms generally is to be avoided because of their low volatility. Alcohols having more than about 8 carbon atoms generally are to be avoided since it is difficult to remove unreacted higher molecular weight alcohols from the post-reacted product and since the presence of unreacted higher molecular weight alcohols in the product mixture can result in dispersant additives having less favorable viscometric properties.

The post-treating reactants of group (iii), i.e. polyamine compounds Containing at least two reactive amino groups per molecule, generally comprise from 2 to about 60, preferably 2 to 40 (e.g. 3 to 20), total carbon atoms and about 2 to 12, preferably 2 to 9, and most preferably 3 to 9 nitrogen atoms per molecule. These amines may be hydrocarbyl amines or may be hydrocarbyl amines including other groups, e.g., alkoxy groups, amide groups, nitrile, imidazoline groups, morpholine groups and the like. Preferred amines of group (iii) are aliphatic saturated amines, including those of the general formulas:

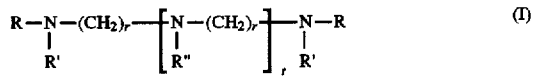

wherein R, R', and R" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; and $C_1$ to $C_{12}$ alkylamino $C_2$ to $C_6$ alkylene radicals; and wherein R" can additionally comprise a moiety of the formula:

wherein R' is as defined above, and wherein r and r' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 10. To assure a facile reaction, it is preferred that R, R', R", r, r', t and t' be selected in a manner sufficient to provide the compounds of Formula I with typically at least one primary amino group, and at least one other reactive primary or secondary amino group. This can be achieved by appropriately selecting said R, R', and R" groups to be hydrogen or by letting t in Formula I be at least one when R" is H or when the moiety of Formula II possesses a primary or secondary amino group. The most preferred amine compounds of the above type are those represented by Formula I which contain at least two primary amino groups and at least one, and preferably at least three, secondary amino groups.

Non-limiting examples of suitable amine compounds of group (iii) include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-di-(2-aminoethyl) ethylene diamine; N-methyethylenediamine; N-ethylethylenediamine; N-dodecyl-1,3-propane diamine; di-, and tri-tallow amines and mixtures thereof.

Other useful group (iii) amine compounds include: alicyclic diamines such as 1,4-di(aminomethyl) cyclohexane, and heterocyclic nitrogen compounds such as imidazolines, and N-aminoalkyl piperazines of the general formula (III):

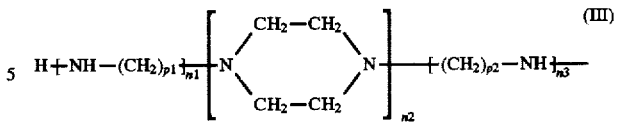

wherein $P_1$ and $P_2$ are the same or different and are each integers of from 2 to 4, and $n_1$, $n_2$ and $n_3$ are the same or different and are each integers of from 1 to 3. Non-limiting examples of such amines include 2-pentadecyl imidazoline; N-(2-aminoethyl)piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylene tetramine, tetraethylene pentamine and isomeric piperazines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful group (iii) amines also include polyoxyalkylene polyamines such as those of the formula (IV):

$$NH_2\text{—alkylene-(O-alkylene)}_m\text{—}NH_2 \quad (IV)$$

where m has a value of about 3 to 59 and preferably 10 to 35; and the formula (V):

$$R^4\text{-(alkylene-(O-alkylene)}_{n4}\text{—}NH_2)_a \quad (V)$$

where $n_4$ has a value of about 1 to 28 with the provision that the sum of all carbon atoms is from about 2 to about 60 and preferably from about 2 to about 40, and $R^4$ is a polyvalent saturated hydrocarbon radical of up to ten carbon atoms wherein the number of substituents on the $R^4$ group is represented by the value of "a", which is a number of from 3 to 6. The alkylene groups in either formula (IV) or (V) may be straight or branched chains containing about 2 to 7, and preferably about 2 to 4 carbon atoms.

The polyoxyalkylene polyamines of formulas (IV) or (V) above, preferably polyoxyalkylene diamines and polyoxyalkylene triamines, may have average molecular weights ranging from about 200 to about 4000 and preferably from about 400 to about 2000. The preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

A particularly useful class of group (iii) amines comprise bis(p-amino cyclohexyl)methane (PACM) and oligomers and mixtures of PACM with isomers and analogs thereof containing on average, from 2 to 6 or higher (usually 3 to 4) cyclohexyl rings per PACM oligomer molecule. The PACM structure can be represented by the formula:

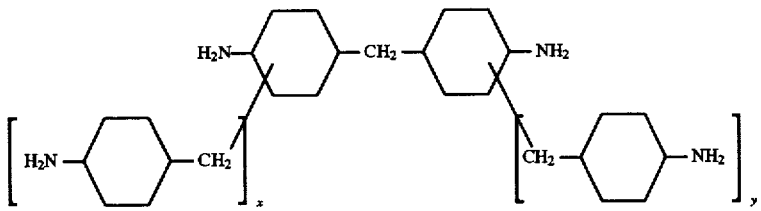

wherein x and y are the same or different and are integers of from 0 to 4, and preferably from 0 to 2, and wherein the sum of x+y is from 1 to 4, preferably from 1 to 2.

The total nitrogen content of the PACM oligomers will comprise generally from 8 to 16 wt. %, and preferably from 10 to 14 wt.%.

The PACM oligomers can be obtained, e.g., by fractionation, or distillation, as a heavies by-product or bottoms from the PACM-containing product produced by high pressure catalytic hydrogenation of methylenedianiline. The hydrogenation of methylene dianiline and the separation of PACM oligomers from the resulting hydrogenation product can be accomplished by known means, including the processes disclosed in U.S. Pat. Nos. 2,511,028; 2,606,924; 2,606,925; 2,606,928; 3,914,307; 3,959,374; 4,293,687; 4,394,523, 4,448,995 and 4,754,070, the disclosures of which are incorporated herein by reference in their entirety.

Still another useful class of group (iii) amines are the polyamido and related amines disclosed in U.S. Pat. Nos. 4,857,217 and 4,956,107 (the disclosures of which are hereby incorporated by reference in their entirety), which comprise reaction products of a polyamine and an alpha, beta unsaturated compound of the formula:

wherein X is sulfur or oxygen, Y is —OR$^8$, —SR$^8$, or —NR$^8$(R$^9$), and R$^5$, R$^6$, R$^7$, R$^8$ and R$^9$ are the same or different and are hydrogen or substituted or unsubstituted hydrocarbyl. Any polyamine, whether aliphatic, cycloaliphatic, heterocyclic, etc., (but not aromatic) can be employed provided it is capable of adding across the acrylic double bond and amidifying with for example the carbonyl group (—C(O)—) of the acrylate-type compound of formula VI, or with the thiocarbonyl group (—C(S)—) of the thioacrylate-type compound of formula VI.

When R$^5$, R$^6$, R$^7$, R$^8$ or R$^9$ in Formula VI are hydrocarbyl, these groups can comprise alkyl, cycloalkyl, or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of R$^5$ through R$^9$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like.

When one or more of R$^5$ and R$^9$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of R$^5$ through R$^9$ are heterocyclic, the heterocyclic group generally consists of a compound having at least one ring of 6 to 12 members in which one or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

wherein R$^5$, R$^6$, R$^7$, and R$^8$ are the same or different and are hydrogen or substituted or unsubstituted hydrocarbyl as defined above. Examples of such alpha, beta-ethylenically unsaturated carboxylate compounds of formula VII are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid, 3-methyl-2-heptenoic acid, 3-methyl-2-butenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid, 3-cyclohexyl-2-methyl-2-pentenoic acid, 2-propenoic acid, methyl 2-propenoate, methyl 2-methyl 2-propenoate, methyl 2-butenoate, ethyl 2-hexenoate, iso-propyl 2-decenoate, tertiary butyl 2-propenoate, octadecyl 2-propenoate, dodecyl 2-decenoate, cyclopropyl 2,3-dimethyl-2-butenoate, and the like.

The alpha, beta ethylenically unsaturated carboxylate thioester compounds employed herein have the following formula:

wherein R$^5$, R$^6$, R$^7$, and R$^8$ are the same or different and are hydrogen or substituted or unsubstituted hydrocarbyl as defined above. Examples of such alpha, beta-ethylenically unsaturated carboxylate thioesters of formula VIII are methylmercapto 2-butenoate, ethylmercapto 2-hexenoate, isopropylmercapto 2-decenoate, tertiary butylmercapto 2-propenoate, octadecylmercapto 2-propenoate, dodecylmercapto 2-decenoate, cyclopropyl-mercapto 2,3-dimethyl-2-butenoate, methylmercapto 2-propenoate, methylmercapto 2-methyl-2-propenoate, and the like.

The alpha, beta ethylenically unsaturated carboxyamide compounds employed herein have the following formula:

wherein R$^5$, R$^6$, R$^7$, R$^8$ and R$^9$ are the same or different and are hydrogen or substituted or unsubstituted hydrocarbyl as defined above. Examples of alpha, beta-ethylenically unsaturated carboxyamides of formula IX are 2-butenamide, 2-hexenamide, 2-decenamide, 3-methyl-2-heptenamide, 3-methyl-2-butenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl-2-pentenamide, N-methyl 2-butenamide, N-methyl 2-butenamide, N,N-diethyl 2-hexenamide, N-isopropyl 2-decenamide, N-tertiary butyl 2-propenamide, N-octadecyl 2-propenamide, N-N-didodecyl 2-decenamide, N-cyclopropyl 2,3-dimethyl-2-butenamide, 2-propenamide, 2-methyl-2-propenamide, 2-ethyl-2-propenamide and the like.

The alpha, beta ethylenically unsaturated thiocarboxylate compounds employed herein have the following formula:

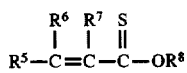
(X)

wherein $R^5$, $R^6$, $R^7$, and $R^8$ are the same or different and are hydrogen or substituted or unsubstituted hydrocarbyl as defined above. Examples of alpha, beta-ethylenically unsaturated thiocarboxylate compounds of formula X are 2-butenthioic acid, 2-hexenthioic acid, 2-decenthioic acid, 3-methyl-2-heptenthioic acid, 3-methyl-2-butenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, tertiary butyl 2-propenthioate, octadecyl 2-propenthioate, dodecyl 2-decenthioate, cyclopropyl 2,3-dimethyl-2-butenthioate, and the like.

The alpha, beta ethylenically unsaturated dithioic acid and acid ester compounds employed herein have the following formula:

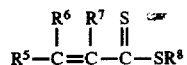
(XI)

wherein $R^5$, $R^6$, $R^7$, and $R^8$ are the same or different and are hydrogen or substituted or unsubstituted hydrocarbyl as defined above. Examples of alpha, beta-ethylenically unsaturated dithioic acids and acid esters of formula XI are 2-butendithioic acid, 2-hexendithioic acid, 2-decendithioic acid, 3-methyl-2-heptendithioic acid, 3-methyl-2-butendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclohexyl-2-methyl-2-pentendithioic acid, 2-propendithioic acid, methyl 2-propendithioate, methyl 2-methyl 2-propendithioate, methyl 2-butendithioate, ethyl 2-hexendithioate, isopropyl 2-decendithioate, tertiary butyl 2-propendithioate, octadecyl 2-propendithioate, dodecyl 2-decendithioate, cyclopropyl 2,3-dimethyl-2-butendithioate, and the like.

The alpha, beta ethylenically unsaturated thiocarboxyamide compounds employed herein have the following formula:

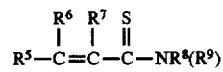
(XII)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated thiocarboxyamides of formula XII are 2-butenthioamide, 2-hexenthioamide, 2-decenthioamide, 3-methyl-2-heptenthioamide, 3-methyl-2-butenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthio-amide, 3-cyclohexyl-2-methyl-2-pententhioamide, N-methyl 2-butenthioamide, N,N-diethyl 2-hexenthioamide, N-isopropyl 2-decenthioamide, N-tertiary butyl 2-propenthioamide, N-octadecyl 2-propenthioamide, N-N-didodecyl 2-decenthioamide, N-cyclopropyl 2,3-dimethyl-2-butenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

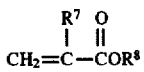
(XIII)

where $R^7$ is hydrogen or a $C_1$ to $C_4$ alkyl group, such as methyl, and $R^8$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. In the preferred embodiments these compounds are acrylic and methacrylic esters such as methyl or ethyl acrylate, methyl or ethyl methacrylate. When the selected alpha, beta-unsaturated compound comprises a compound of formula VI wherein X' is oxygen, the resulting reaction product with the polyamine contains at least one amido linkage (—C(O)N<) and such materials are herein termed "amido-amines." Similarly, when the selected alpha, beta unsaturated compound of formula VI comprises a compound wherein X' is sulfur, the resulting reaction product with the polyamine contains thioamide linkage (—C(S)N<) and these materials are herein termed "thioamido-amines." For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula VI tends to yield an amido-amine which is more cross-linked than that obtained where substantially equimolar amounts of reactants are employed. Where for economic or other reasons a cross-linked amido-amine using excess amine is desired, generally a molar excess of the ethylenically unsaturated reactant of about at least 10%, such as 10–300%, or greater, for example, 25–200%, is employed. For more efficient cross-linking an excess of carboxylated material should preferably be used since a cleaner reaction ensues. For example, a molar excess of about 10–100% or greater such as 10–50%, but preferably an excess of 30–50%, of the carboxylated material. Larger excess can be employed if desired.

In summary, without considering other factors, equimolar amounts of reactants tend to produce a more linear amido-amine whereas excess of the formula VIII reactant tends to yield a more cross-linked amido-amine. It should be noted that the higher the polyamine (i.e., the greater the number of amino groups on the molecule) the greater the statistical probability of cross-linking since, for example, a tetraalkylenepentamine, such as tetraethylene pentamine

(XIV)

has more labile hydrogens than ethylene diamine.

These amido-amine adducts so formed are characterized by both amido and amino groups. In their simplest embodiments they may be represented by units of the following idealized formula (XV):

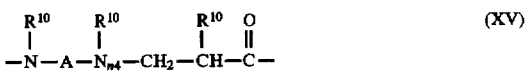

wherein the $R^{10}$'s, which may be the same or different, are hydrogen or a substituted group, such as a hydrocarbon group, for example, alkyl, alkenyl or alkynyl, and A is a moiety of the polyamine which, for example, may be cycloalkyl, alkyl, etc. (excluding aromatic hydrocarbyl), and n4 is an integer such as 1–10 or greater.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines employed in this invention are not cross-linked to any substantial degree, and more preferably are substantially linear.

Preferably, the polyamine reactant contains at least one primary amine (and more preferably from 2 to 4 primary amines) group per molecule, and the polyamine and the unsaturated reactant of formula VI are contacted in an amount of from about 1 to 10, more preferably from about 2 to 6, and most preferably from about 3 to 5, equivalents of primary amine in the polyamine reactant per mole of the unsaturated reactant of formula VI.

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80°–90° C., for a suitable period of time, such as a few hours. Where an acrylic-type ester is employed, the progress of the reaction can be judged by the removal of the alcohol in forming the amide. During the early part of the reaction alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yield of at least 95% are generally obtained.

Similarly, it will be understood that the reaction of an ethylenically unsaturated carboxylate thioester of formula VIII liberates the corresponding $HSR^8$ compound (e.g., $H_2S$ when $R^8$ is hydrogen) as a by-product, and the reaction of an ethylenically unsaturated carboxyamide of formula IX liberates the corresponding $HNR^8(R^9)$ compound (e.g., ammonia when $R^8$ and $R^9$ are each hydrogen) as by-product.

The reaction time involved can vary widely depending on a wide variety of factors. For example, there is a relationship between time and temperature. In general, lower temperature demands longer times. usually, reaction times of from about 2 to 30 hours, such as 5 to 25 hours, and preferably 3 to 10 hours will be employed.

Although one can employ a solvent, the reaction can be run without the use of any solvent. In fact, where a high degree of cross-linking is desired, it is preferable to avoid the use of a solvent and most particularly to avoid a polar solvent such as water. However, taking into consideration the effect of solvent on the reaction, where desired, any suitable solvent can be employed, whether organic or inorganic, polar or non-polar.

The post-treating reactants in group (iv), i.e. the polyol compounds containing at least two reactive hydroxy groups, generally comprise up to about 100 carbon atoms and from 2 to about 10, and preferably 3 to about 8 hydroxy groups per molecule. These polyols can be quite diverse in structure and chemical composition. For example, they can be substituted or unsubstituted, hindered or unhindered, branched chain or straight chain, etc. as desired. Typical polyols are alkylene glycols such as ethylene glycol, propylene glycol, trimethylene glycol, butylene glycol, and polyglycol such as diethylene glycol, triethylene glycol, tetraethylene glycol, dipropylene glycol, tripropylene glycol, dibutylene glycol, tributylene glycol, and other alkylene glycols and polyalkylene glycols in which the alkylene radical contains from two to about eight carbon atoms. Other useful polyhydric alcohols include glycerol, monomethyl ether of glycerol, pentaerythritol, dipentaerythritol, tripentaerythritol, 9,10-dihydroxy-stearic acid, the ethyl ester of 9,10-dihydroxystearic acid, 3-chloro-1,2-propanediol, 1,2-butanediol, 1,4-butanediol, 2,3-hexanediol, 2,3-hexanediol, pinacol, tetrahydroxy pentane, erythritol, arabitol, sorbitol, mannitol, 1,2-cyclohexanediol, 1,4-cyclohexanediol, 1,4-(2-hydroxyethyl)-cyclohexane, 1,4-dihydroxy-2-nitrobutane, 1,4-di-(2-hydroxyethyl)-benzene, the carbohydrates such as glucose, and the like, copolymer of allyl alcohol and styrene, etc.

Included among the polyols which may be employed are the cyclic poly(methylol) compounds, such as 2,2,6,6-tetramethylol cyclohexanol, tetrahydro-3,3,5,5-tetrakis-(hydroxymethyl)-4-pyranol and tetrahydro-3,3,5-tris-(hydroxymethyl)-5-methyl-4-pyranol; and yet another class of useful polyol reactants include heterocyclic polyols of the formula

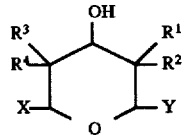

wherein $R^1$, $R^2$, $R^3$, and $R^4$ are the same or different and are selected from the group consisting of H, alkyl and —CH(OH) $(R^5)$ wherein $R^5$ is hydrogen or $C_1$ to $C_{10}$ alkyl, and wherein X and Y are the same or different and are H or alkyl of from 1 to 10 carbon atoms with the proviso that at least one of $R^1$, $R^2$, $R^3$ and $R^4$ is the —CH(OH)$R^5$ moiety.

When $R^1$, $R^2$, $R^3$ or $R^4$ is alkyl, the alkyl group will generally contain from 1 to 10 carbon atoms, preferably 1 to 3 carbon atoms. Exemplary of such alkyl groups are methyl, ethyl, propyl, isopropyl, butyl, isobutyl, pentyl, 3-methylbutyl, hexyl, nonyl, heptyl, decyl, isodecyl, and the like.

The $R^5$ alkyl substituent in the —CH(OH)$(R^5)$ moiety may be straight chain or branched chain. Preferably $R^5$ is $C_1$ to $C_5$ alkyl, with $C_1$ to $C_3$ alkyl being more preferred. Exemplary of such moieties are:

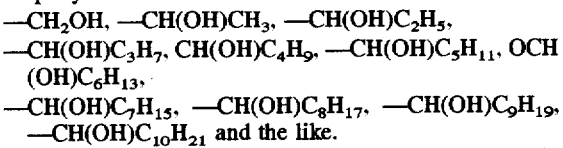

The above-discussed heterocyclic polyols and cyclic poly (methylol) compounds are described more fully in U.S. Pat. No. 4,797,219, the disclosure of which is incorporated by reference herein in its entirety.

The post-treating reactants in group (v), i.e. aminoalcohol compounds having at least one reactive amino group and at least one reactive hydroxy group per molecule, include aminoalcohol compounds containing up to about 50 total carbon atoms, preferably up to about 10 total carbon atoms, from about 1 to about 5 nitrogen atoms, preferably from 1 to 3 nitrogen atoms, and from about 1 to about 15 hydroxyl groups, preferably from 1 to about 5 hydroxyl groups. Preferred aminoalcohol compounds include the 2,2-disubstituted-2-amino-1-alkanols having from two to three hydroxy groups and containing a total of 4 to 8 carbon atoms. These preferred aminoalcohol compounds can be represented by the formula:

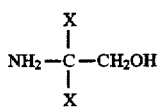

wherein X is an alkyl or hydroxyalkyl group with the alkyl groups having from 1 to 3 carbon atoms wherein at least one, and preferably both, of the X substituents is a hydroxyalkyl group of the structure —(CH$_2$)$_n$OH, n being 1 to 3. Examples of such amino alcohols include: 2-amino-2-methyl-1,3 propanediol, 2-amino-2-ethyl-1,3-propanediol, and 2-amino-2-(hydroxymethyl) 1,3-propanediol, the latter also being known as THAM or tris (hydroxymethyl) amino methane. THAM is particularly preferred because of its effectiveness, availability and low cost.

The post-treating reactants (i)–(v) may be used alone or in admixture with one another. However, as will be discussed more fully hereinbelow, when the post-treating reactant comprises a polyfunctional compound, i.e. a compound containing more than one reactive group, regardless of whether such reactive group is an amino group or a hydroxy group, it is necessary to use sufficient chain-stopping or end-capping reactant in combination with the polyfunctional post-treating reactant to ensure that the grafted and post-reacted product mixture will be gel-free.

Chain-Stopping Reactant

The chain-stopping or end-capping reactants contemplated for use in this invention include monofunctional reactants which are capable of reacting with reactive amine groups or reactive hydroxy groups present in the polyfunctional post-treating reactants of groups (ii)–(V) or with the acid producing groups which are grafted or otherwise attached to the alpha-olefin polymer to inhibit cross linking and gelation and/or viscosity increase due to any further reaction of unreacted amino groups or hydroxy groups in the grafted and aminated or esterified alpha-olefin polymer. Preferred chain-stopping or end-capping reactants include, for example, hydrocarbyl substituted dicarboxylic anhydride or acid, preferably succinic anhydride or acid, having from about 12 to 400 carbons in the hydrocarbyl group; long chain monocarboxylic acid of the formula RCOOH where R is a hydrocarbyl group of 12 to 400 carbons in the hydrocarbyl group; alcohol compounds of the type described above in connection with the nucleophilic post-treating reactants of group (ii), i.e., alcohol compounds having only a single hydroxy group per molecule; and amine compounds of the type described above in connection with the post-treating reactants of group (i), i.e., amine compounds having only a single reactive amine group per molecule. The hydrocarbyl groups are essentially aliphatic and include alkenyl and alkyl groups. The longer chain acids and anhydrides are preferred, particularly when the grafting reaction is carried out in lubricating oil because of their ability to impart dispersancy to reacted oil molecules as well as their greater solubilizing effect. In one preferred embodiment, the chain-stopping or end-capping reactant comprises a C$_{12}$ to C$_{49}$ hydrocarbyl substituted succinic anhydride, e.g. a C$_{12}$ to C$_{18}$ hydrocarbyl substituted succinic anhydride. In other preferred embodiments, the hydrocarbyl substituent contains from 50 to about 400 carbon atoms.

Primarily because of its ready availability and low cost, the hydrocarbyl portion, e.g. alkenyl groups, of the carboxylic acid or anhydride is preferably derived from a polymer of a C$_2$ to C$_5$ monoolefin, said polymer generally having a molecular weight of about 140 to 6500, e.g. 700 to about 5000, most preferably 700 to 3000 molecular weight. Particularly preferred polymer is polyisobutylene. Particularly preferred chain-stopping reactants include polyisobutylene succinic anhydride wherein the number average molecular weight of the polyisobutylene portion is from about 700 to about 2500.

Pre-Reacted Post-Treating Reactant/Chain-Stopping Reactant

The aforesaid nucleophilic post-treating reactants (iii)–(v) having more than one reactive amino and/or hydroxy group and the chain-stopping or end-capping reactants may be pre-reacted with the chain-stopping or end-capping reactant generally being attached to the post-treating reactant through salt, imide, amide amidine, ester, or other linkages so that a single reactive group of the post-treating reactant is still available for reaction with the acid producing moieties of the grafted polymer.

A convenient source of these prereacted materials are the well-known lubricating oil dispersants, provided they retain reactive amine and/or hydroxy groups capable of further reaction with the grafted polymer.

Usually, these dispersants are made by condensing a hydrocarbyl substituted monocarboxylic acid or a dicarboxylic acid, having about 50 to 400 carbons in the hydrocarbyl substituent, preferably a succinic acid producing material such as alkenyl succinic anhydride, with a polyamine, polyol or aminoalcohol, including those described above as post-treating reactants (iii)–(v).

Monocarboxylic acid dispersants have been described in U.K. Patent Specification No. 983,040. There, polyamines are reacted with the high molecular weight monocarboxylic acid derived from a polyolefin, such as polyisobutylene, by oxidation with nitric acid or oxygen; or by addition of halogen to the polyolefin followed by hydrolyzing and oxidation; etc. Another method is taught in Belgian Pat. No. 658,236 where polyolefin, such as the polymers of C$_2$ to C$_5$ monoolefin, e.g. polypropylene or polyisobutylene, is halogenated, e.g. chlorinated, and then condensed with an alpha, beta-unsaturated, monocarboxylic acid of from 3 to 8, preferably 3 to 4, carbon atoms, e.g. acrylic acid, alpha-methyl-acrylic acid, i.e., 2-methyl propanoic acid, crotonic acid, etc., and then reacted with polyamine.

Formation of dicarboxylic acid dispersant by reaction of an amine with alkenyl succinic anhydride prepared from the reaction of a polyolefin or chlorinated polyolefin and maleic anhydride, etc. is well known in the art, as seen, for example, in U.S. Pat. No. 3,272,746.

Most preferred are the lubricating oil dispersants made by reaction of the aforesaid saturated aliphatic amines of formula I with alkenyl succinic anhydride.

Reaction, preferably amination and/or imidation and/or esterification of the carboxylic acid material is usefully done as a solution reaction with the acid material, usually polyisobutenyl succinic anhydride dissolved in a solvent such as mineral oil to which the other reactant is added. The formation of the dispersants in high yield can be effected by adding from about 0.5 to 3.3, preferably about 0.7 to 1.3, most preferably about 1 to 1 molar proportions of the alkylene polyamine, polyol or aminoalcohol per molar proportion of alkenyl succinic anhydride to said solution and heating the mixture at 140° C. to 165° C. or higher until the appropriate amount of water of reaction is evolved. Typically the mineral oil solvent is adjusted so that it constitutes 50% by weight of the final dicarboxylic acid dispersant compound solution.

Reaction of Polymer Substituted Mono- and Dicarboxylic Acid Material with Post-Treating Reactant From the foregoing description, it is apparent that the selected polymer grafted with acid producing moieties, e.g., ethylene-propylene copolymer substituted succinic anhydride, can be reacted with any individual post-treating reactant (or post-treating reactant and chain-stopping or end-capping reactant) or any combination of two or more of any of these reactants; that is, for example, one or more monoreactive amines, monoreactive alcohols, polyamines, polyols and/or aminoalcohols can be used, so long as sufficient monoreactive reactant is used when a reactant having more than one reactive group is used to ensure a gel-free reaction.

The reaction between the polymer grafted with acid producing moieties and the nucleophilic post-treating and/or chain-stopping or end-capping reactants is readily accomplished, for example, by heating a solution containing 5 to 95 wt. percent of the grafted polymer in a substantially inert organic solvent or diluent at about 100° to 250° C., preferably 125° to 175° C., generally for 1 to 10, e.g., 2 to 6 hours until the desired amount of water is removed.

Suitable diluents include, for example, aliphatic, cycloaliphatic, and aromatic hydrocarbons, as well as the corresponding halogenated hydrocarbons, particularly chlorinated hydrocarbons. These diluents are exemplified by benzene, toluene, xylene, chlorobenzenes, hexane, heptane, or mixtures of these. Mineral oils particularly low viscosity mineral oils are very good diluents. Preferred diluents are mineral oils of lubricating viscosity.

Reaction ratios of polymer substituted with carboxylic acid material to equivalents of amine reactant, as well as the other nucleophilic post-treating reactants and chain-stopping or end-capping reactants described herein, can vary considerably, depending, e.g., on the reactants and type of bonds formed. Generally, when an amine compound or other nucleophilic reactant, is reacted with a polymer substituted with carboxylic acid material, i.e., polymer containing carboxylic acid producing moieties derived from any of the above monounsaturated carboxylic acids, or anhydride or ester derivatives thereof, from about 0.05 to 4.0, preferably from about 0.5 to 2.0, e.g., 0.6 to 1.5, moles of carboxylic acid moiety content (e.g., grafted maleic anhydride content) is used, per equivalent of nucleophilic reactant.

Canadian Patent 956,397 is expressly incorporated herein by reference for its disclosure of procedures for reacting amines with the alpha-olefin polymer substituted with carboxylic acid producing moieties. All that is required to apply the processes of that patent to this invention is to substitute, on an equivalent weight basis, the alpha-olefin polymer substituted with carboxylic acid producing moieties of this invention for the high molecular weight carboxylic acid acylating agents disclosed in that Canadian patent, and to make certain that a sufficient amount of monoreactive nucleophilic reactant is employed to ensure that the reaction product mixture is gel-free. Dispersant additives of this invention prepared utilizing the processes generally described in the Canadian patent constitute a preferred class of compositions. The following U.S. Patents are also incorporated herein by reference, being counterparts of the incorporated Canadian patent, for the same reasons given for incorporating the Canadian patent: 3,836,469; 3,836,470; 3,836,471; 3,838,050; 3,838,052; 3,879,308; 3,957,854; 3,957,855.

A preferred group of ashless dispersants, in accordance with the present invention, are those derived from ethylene-propylene copolymer or ethylene-butene-1 copolymer substituted with succinic anhydride groups and reacted with polyethylene amines, e.g., tetraethylene pentamine, pentaethylene hexamine, polyoxyethylene or polyoxypropylene amines, e.g., polyoxypropylene diamine, and with polyisobutylene succinic anhydride chain-stopping reactant.

Another preferred group of ashless dispersants are those derived from ethylene-propylene or ethylenebutene-1 copolymer substituted with succinic anhydride groups and reacted with monofunctional heterocyclic amines, e.g., N-(3-aminopropyl)morpholine.

Oleaginous Compositions

The dispersants of the present invention can be incorporated into a lubricating oil (or a fuel) in any convenient way. Thus, these dispersants can be added directly to the lubricating oil (or fuel) by dispersing or dissolving the same in the lubricating oil (or fuel) at the desired level of concentration of the dispersant. Such blending into the additional lubricating oil (or fuel) can occur at room temperature or elevated temperatures. Alternatively, the dispersants can be blended with a suitable oil-soluble solvent/diluent (such as benzene, xylene, toluene, lubricating base oils and petroleum distillates, including the various normally liquid fuels described in detail below) to form a concentrate, and then blending the concentrate with a lubricating oil (or fuel) to obtain the final formulation. Such dispersant concentrates will typically contain (on an active ingredient (A.I.) basis) from about 3 to about 45 wt. %, and preferably from about 10 to about 35 wt. %, dispersant additive, and typically from about 30 to 90 wt. %, preferably from about 40 to 60 wt. %, base oil, based on the concentrate weight.

When the products of this invention are incorporated into crude oil refinery process streams and other hydrocarbon fluid process streams, they function as antifoulants and will be generally used, e.g., in amounts of up to 100 ppm, e.g., 5 to 50 ppm, in the same manner as the macrocyclic polyamine additive as described in U.S. Pat. No. 4,569,750, the disclosure of which is hereby incorporated by reference, in its entirety.

The dispersant products of the present invention possess very good dispersant properties as measured herein in a wide variety of environments. Accordingly, the dispersant products are used by incorporation and dissolution into an oleaginous materials such as fuels and lubricating oils. When the dispersant products of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to about 0.5, and preferably 0.005 to about 0.15 weight percent, based on the total weight of the composition, will usually be employed. The properties of such fuels are well known as illustrated, for example, by ASTM Specifications D #396-73 (Fuel Oils) and D #439-73 (Gasolines) available from the American Society for Testing Materials ("ASTM"), 1916 Race Street, Philadelphia, Pennsylvania 19103.

The fuel compositions of this invention can contain, in addition to the products of this invention, other additives which are well known to those of skill in the art. These can include anti-knock agents such as tetraalkyl lead compounds, lead scavengers such as haloalkanes, deposit preventers or modifiers such as triaryl phosphates, dyes, cetane improvers, antioxidants such as 2,6-ditertiary-butyl-4-methylphenol, rust inhibitors, bacteriostatic agents, gum inhibitors, metal deactivators, upper cylinder lubricants and the like.

The dispersant products of the present invention find their primary utility in lubricating oil compositions which employ a base oil in which the additives are dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additive mixtures of the present invention.

These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, and other ashless dispersant (e.g., polyisobutenyl succinimides) and borated derivatives thereof), etc.

In the preparation of lubricating oil formulations it is common practice to introduce the additives in the form of 10 to 80 wt. %, e.g., 20 to 80 wt. % active ingredient concentrates in hydrocarbon oil, e.g. mineral lubricating oil, or other suitable solvent. Usually these concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, a dispersant would be usually employed in the form of a 40 to 50 wt. % concentrate, for example, in a lubricating oil fraction.

The ashless dispersants of the present invention will be generally used in admixture with a lube oil basestock, comprising an oil of lubricating viscosity, including natural and synthetic lubricating oils and mixtures thereof.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of poly-ethylene glycol having a molecular weight of 500–1000, diethyl ether of polypropylene glycol having a molecular weight of 1000–1500); and mono- and polycarboxylic esters thereof, for example, the acetic acid esters, mixed $C_3$–$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetra-isopropyl silicate, tetra-(2-ethylhexyl)silicate, tetra-(4-methyl-2-ethylhexyl)silicate, tetra-(p-tertbutylphenyl)silicate, hexa-(4-methyl-2-pentoxy) disiloxane, poly(methyl)siloxanes and poly(methylphenyl) siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Metal containing rust inhibitors and/or detergents are frequently used with ashless dispersants. Such detergents and rust inhibitors include the metal salts of sulphonic acids, alkyl phenols, sulphurized alkyl phenols, alkyl salicylates, naphthenates, and other oil soluble mono- and di-carboxylic acids. Highly basic, that is overbased metal salts which are frequently used as detergents appear particularly prone to interaction with the ashless dispersant. Usually these metal containing rust inhibitors and detergents are used in lubricating oil in amounts of about 0.01 to 10, e.g. 0.1 to 5 wt. %, based on the weight of the total lubricating composition. Marine diesel lubricating oils typically employ such metal-containing rust inhibitors and detergents in amounts of up to about 20 wt. %.

Highly basic alkaline earth metal sulfonates are frequently used as detergents. They are usually produced by heating a mixture comprising an oil-soluble sulfonate or alkaryl sulfonic acid, with an excess of alkaline earth metal compound above that required for complete neutralization of any sulfonic acid present and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronaphthalene. The alkylation may be carried out in the presence of a catalyst with alkylating agents having from about 3 to more than 30 carbon atoms. For example haloparaffins, olefins obtained by dehydrogenation of paraffins, polyolefins produced from ethylene, propylene, etc. are all suitable. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

A preferred alkaline earth sulfonate additive is magnesium alkyl aromatic sulfonate having a total base number ranging from about 300 to about 400 with the magnesium sulfonate content ranging from about 25 to about 32 wt. %, based upon the total weight of the additive system dispersed in mineral lubricating oil.

Neutral metal sulfonates are frequently used as rust inhibitors. Polyvalent metal alkyl salicylate and naphthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and naphthenates can be realized by utilizing alkaline earth metal, e.g. calcium, salts of mixtures of $C_8$–$C_{26}$ alkyl salicylates and phenates (see U.S. Pat. No. 2,744,069) or polyvalent metal salts of alkyl salicyclic acids, said acids obtained from the alkylation of phenols followed by phenation, carboxylation and hydrolysis (U.S. Pat. No. 3,704,315) which could then be converted into highly basic salts by techniques generally known and used for such conversion. The reserve basicity of these metal-containing rust inhibitors is usefully at TBN levels of between about 60 and 150. Included with the useful polyvalent metal salicylate and naphthenate materials are the methylene and sulfur bridged materials which are readily derived from alkyl substituted salicylic or naphthenic acids or mixtures of either or both with alkyl substituted phenols. Basic sulfurized salicylates and a method for their preparation is shown in U.S. Pat. No. 3,595,791. Such materials include alkaline earth metal, particularly magnesium, calcium, strontium and barium salts of aromatic acids having the general formula:

$$HOOC-ArR_1-X_y(ArR_1OH)_n \qquad (XVI)$$

where Ar is an aryl radical of 1 to 6 rings, $R_1$ is an alkyl group having from about 8 to 50 carbon atoms, preferably 12 to 30 carbon atoms (optimally about 12), X is a sulfur (—S—) or methylene (—$CH_2$—) bridge, y is a number from 0 to 4 and n is a number from 0 to 4.

Preparation of the overbased methylene bridged salicylate-phenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt of a methylene bridged phenol-salicylic acid of the general formula (XVII):

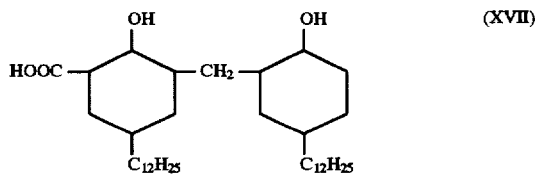

with a TBN of 60 to 150 is highly useful in this invention.

The sulfurized metal phenates can be considered the "metal salt of a phenol sulfide" which thus refers to a metal salt whether neutral or basic, of a compound typified by the general formula (XVIII):

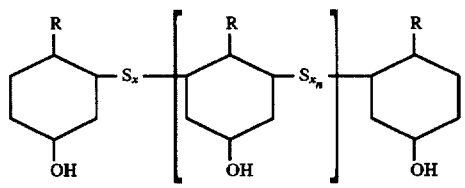

where x=1 or 2, n=0, 1 or 2; or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14% by weight, preferably about 4 to about 12 wt. % sulfur based on the weight of sulfurized alkyl phenol.

The sulfurized alkyl phenol may be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2.

The "overbased" or "basic" sulfurized metal phenates are sulfurized metal phenates wherein the ratio of metal to phenol is greater than that of stoichiometric, e.g. basic sulfurized metal dodecyl phenate has a metal content up to and greater than 100% in excess of the metal present in the corresponding normal sulfurized metal phenates wherein the excess metal is produced in oil-soluble or dispersible form (as by reaction with CO2). The overbased sulfurized metal phenates desirably have a TBN value of at least 150, e.g. from 200 to 300.

Magnesium and calcium containing additives although beneficial in other respects can increase the tendency of the lubricating oil to oxidize. This is especially true of the highly basic sulphonates.

According to a preferred embodiment the invention therefore provides a crankcase lubricating composition also containing from 2 to 8000 parts per million of calcium or magnesium.

The magnesium and/or calcium is generally present as basic or neutral detergents such as the sulphonates and phenates, our preferred additives are the neutral or basic magnesium or calcium sulphonates. Preferably the oils contain from 500 to 5000 parts per million of calcium or magnesium. Basic magnesium and calcium sulphonates are preferred.

A particular advantage of the novel dispersants of the present invention is use with V.I improvers to form multigrade automobile engine lubricating oils. Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The viscosity modifiers may also be derivatized to include other properties or functions, such as the addition of dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Examples of suitable hydrocarbon polymers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g., with isoprene and/or butadiene and hydrogenated derivatives thereof. The polymer may be degraded in molecular weight, for example by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g. see U.S. Pat. Nos. 4,089,794; 4,160,739; 4,137,185; or copolymers of ethylene and propylene reacted or grafted with nitrogen compounds such as shown in U.S. Pat. Nos. 4,068,056; 4,068,058; 4,146,489 and 4,149,984.

The preferred hydrocarbon polymers are ethylene copolymers containing from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha-olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

Terpolymers, tetrapolymers, etc., of ethylene, said $C_{3-28}$ alpha-olefin, and a non-conjugated diolefin or mixtures of such diolefins may also be used. The amount of the non-conjugated diolefin generally ranges from about 0.5 to 20 mole percent, preferably from about 1 to about 7 mole percent, based on the total amount of ethylene and alpha-olefin present.

The polyester V.I. improvers are generally polymers of esters of ethylenically unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2-C_{20}$ aliphatic or aromatic olefin per mole of unsaturated ester, or per mole of unsaturated acid or anhydride followed by esterification. For example, copolymers of styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(beta-diethylaminoethyl)styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 4-vinylpyridine, 3-vinyl-pyridine, 3-methyl-5-vinyl-pyridine, 4-methyl-2-vinyl-pyridine, 4-ethyl-2-vinyl-pyridine and 2-butyl-1-5-vinyl-pyridine and the like.

N-vinyl lactams are also suitable, e.g. N-vinyl pyrrolidones or N-vinyl piperidones.

The vinyl pyrrolidones are preferred and are exemplified by N-vinyl pyrrolidone, N-(1-methylvinyl) pyrrolidone, N-vinyl-5-methyl pyrrolidone, N-vinyl-3, 3-dimethylpyrrolidone, N-vinyl-5-ethyl pyrrolidone, etc.

Dihydrocarbyl dithiophosphate metal salts are frequently used as anti-wear agents and also provide antioxidant activity. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for imparting improved anti-wear properties, with primary giving improved thermal stability properties. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates useful in the present invention are oil soluble salts of dihydrocarbyl esters of dithiophosphoric acids and may be represented by the following formula:

(XIX)

wherein R and R' may be the same or different hydrocarbyl radicals containing from 1 to 18, preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R' in formula XIX) in the dithiophosphoric acid will generally be about 5 or greater.

The antioxidants useful in this invention include oil soluble copper compounds. The copper may be blended into the oil as any suitable oil soluble copper compound. By oil soluble we mean the compound is oil soluble under normal blending conditions in the oil or additive package. The copper compound may be in the cuprous or cupric form. The copper may be in the form of the copper dihydrocarbyl thio- or dithio-phosphates wherein copper may be substituted for zinc in the compounds and reactions described above although one mole of cuprous or cupric oxide may be reacted with one or two moles of the dithiophosphoric acid, respectively. Alternatively the copper may be added as the copper salt of a synthetic or natural carboxylic acid. Examples include $C_{10}$ to $C_{18}$ fatty acids such as stearic or palmitic, but unsaturated acids such as oleic or branched carboxylic acids such as napthenic acids of molecular weight from 200 to 500 or synthetic carboxylic acids are preferred because of the improved handling and solubility properties of the resulting copper carboxylates. Also useful are oil soluble copper dithiocarbamates of the general formula (RR'NCSS)nCu, where n is 1 or 2 and R and R' are the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e., R and R') will generally be about 5 or greater. Copper sulphonates, phenates, and acetylacetonates may also be used.

Exemplary of useful, copper compounds are copper (Cu' and/or Cu") salts of alkenyl succinic acids or anhydrides. The salts themselves may be basic, neutral or acidic. They may be formed by reacting (a) any of the materials above discussed ashless dispersants which have at least one free carboxylic acid (or anhydride) group with (b) a reactive metal compound. Suitable acid (or anhydride) reactive metal compounds include those such as cupric or cuprous hydroxides, oxides, acetates, borates, and carbonates or basic copper carbonate.

Examples of the metal salts of this invention are Cu salts of polyisobutenyl succinic anhydride (hereinafter referred to as Cu-PIBSA), and Cu salts of polyisobutenyl succinic acid. Preferably, the selected metal employed is its divalent form, e.g., $Cu^{+2}$. The preferred substrates are polyalkenyl succinic acids in which the alkenyl group has a molecular weight greater than about 700. The alkenyl group desirably has a $M_n$ from about 900 to 1400, and up to 2500, with a $M_n$ of about 950 being most preferred. Especially preferred is polyisobutylene succinic acid (PIBSA). These materials may desirably be dissolved in a solvent, such as a mineral oil, and heated in the presence of a water solution (or slurry) of the metal bearing material. Heating may take place between 70° and about 200° C. Temperatures of 110° to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-PIBSA, Cu-oleate, or mixtures thereof) will be generally employed in an amount of from about 50–500 ppm by weight of the metal, in the final lubricating composition.

The copper antioxidants used in this invention are inexpensive and are effective at low concentrations and therefore do not add substantially to the cost of the product. The results obtained are frequently better than those obtained with previously used antioxidants, which are expensive and used in higher concentrations. In the amounts employed, the copper compounds do not interfere with the performance of other components of the lubricating composition, in many instances, completely satisfactory results are obtained when the copper compound is the sole antioxidant in addition to the ZDDP. The copper compounds can be utilized to replace part or all of the need for supplementary antioxidants. Thus, for particularly severe conditions it may be desirable to include a supplementary, conventional antioxidant. However, the amounts of supplementary antioxidant required are small, far less than the amount required in the absence of the copper compound.

While any effective amount of the copper antioxidant can be incorporated into the lubricating oil composition, it is contemplated that such effective amounts be sufficient to provide said lube oil composition with an amount of the copper antioxidant of from about 5 to 500 (more preferably 10 to 200, still more preferably 10 to 180, and most preferably 20 to 130 (e.g., 90 to 120))part per million of added copper based on the weight of the lubricating oil composition. Of course, the preferred amount may depend amongst other factors on the quality of the basestock lubricating oil.

Corrosion inhibitors, also known as anti- corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 weight percent of a sulfide of phosphorus for ½ to 15 hours, at a temperature in the range of 65° to 315° C. Neutralization of the phosphosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenolthioesters having preferably $C_5$ to $C_{12}$ alkyl side chains, calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxy-alkylene hydrocarbyl succinimide, S-carboxyalkylene hydrocarbyl succinamic acid and mixtures thereof; U.S. Pat. No. 3,879,306 which discloses N-(hydroxyalkyl) alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are glycerol mono and dioleates, and succinate esters, or metal salts thereof, of hydrocarbyl substituted succinic acids or anhydrides and thiobis alkanols such as described in U.S. Pat. No. 4,344,853.

Pour point depressants lower the temperature at which the lubricating oil will flow or can be poured. Such depressants are well known. Typical of those additives which usefully optimize the low temperature fluidity of the fluid are $C_8$–$C_{18}$ dialkylfumarate vinyl acetate copolymers, polymethacrylates, and wax naphthalene.

Foam control can be provided by an antifoamant of the polysiloxane type, e.g. silicone oil and polydimethyl siloxane.

Organic, oil-soluble compounds useful as rust inhibitors in this invention comprise nonionic surfactants such as polyoxyalkylene polyols and esters thereof, and anionic surfactants such as salts of alkyl sulfonic acids. Such anti-rust compounds are known and can be made by conventional means. Nonionic surfactants, useful as anti-rust additives in the oleaginous compositions of this invention, usually owe their surfactant properties to a number of weak stabilizing groups such as ether linkages. Nonionic anti-rust agents containing ether linkages can be made by alkoxylating organic substrates containing active hydrogens with an excess of the lower alkylene oxides (such as ethylene and propylene oxides) until the desired number of alkoxy groups have been placed in the molecule.

The preferred rust inhibitors are polyoxyalkylene polyols and derivatives thereof. This class of materials are commercially available from various sources: Pluronic Polyols from Wyandotte Chemicals Corporation; Polyglycol 112-2, a liquid triol derived from ethylene oxide and propylene oxide available from Dow Chemical Co.; and Tergitol, dodecylphenyl or monophenyl polyethylene glycol ethers, and Ucon, polyalkylene glycols and derivatives, both available from Union Carbide Corp. These are but a few of the commercial products suitable as rust inhibitors in the improved composition of the present invention.

In addition to the polyols per se, the esters thereof obtained by reacting the polyols with various carboxylic acids are also suitable. Acids useful in preparing these esters are lauric acid, stearic acid, succinic acid, and alkyl- or alkenyl-substituted succinic acids wherein the alkyl or alkenyl group contains up to about twenty carbon atoms.

The preferred polyols are prepared as block polymers. Thus, a hydroxy-substituted compound, R—$(OH)_n$ (wherein n is 1 to 6, and R is the residue of a mono- or polyhydric alcohol, phenol, naphthol, etc.) is reacted with propylene oxide to form a hydrophobic base. This base is then reacted with ethylene oxide to provide a hydrophilic portion resulting in a molecule having both hydrophobic and hydrophilic portions. The relative sizes of these portions can be adjusted by regulating the ratio of reactants, time of reaction, etc., as is obvious to those skilled in the art. Thus it is within the skill of the art to prepare polyols whose molecules are characterized by hydrophobic and hydrophilic moieties which are present in a ratio rendering rust inhibitors suitable for use in any lubricant composition regardless of differences in the base oils and the presence of other additives.

If more oil-solubility is needed in a given lubricating composition, the hydrophobic portion can be increased and/or the hydrophilic portion decreased. If greater oil-in-water emulsion breaking ability is required, the hydrophilic and/or hydrophobic portions can be adjusted to accomplish this.

Compounds illustrative of R—$(OH)_n$ include alkylene polyols such as the alkylene glycols, alkylene triols, alkylene tetrols, etc., such as ethylene glycol, propylene glycol, glycerol, pentaerythritol, sorbitol, mannitol, and the like. Aromatic hydroxy compounds such as alkylated mono- and polyhydric phenols and naphthols can also be used, e.g., heptylphenol, dodecylphenol, etc.

Other suitable demulsifiers include the esters disclosed in U.S. Pat. Nos. 3,098,827 and 2,674,619.

The liquid polyols available from Wyandotte Chemical Co. under the name Pluronic Polyols and other similar polyols are particularly well suited as rust inhibitors. These Pluronic Polyols correspond to the formula:

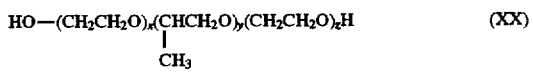

(XX)

wherein x,y, and z are integers greater than 1 such that the $CH_2CH_2O$ groups comprise from about 10% to about 40% by weight of the total molecular weight of the glycol, the average molecule weight of said glycol being from about 1000 to about 5000. These products are prepared by first condensing propylene oxide with propylene glycol to produce the hydrophobic base

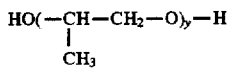

$$HO(-CH(CH_3)-CH_2-O)_y-H \quad (XXI)$$

This condensation product is then treated with ethylene oxide to add hydrophilic portions to both ends of the molecule. For best results, the ethylene oxide units should comprise from about 10 to about 40% by weight of the molecule. Those products wherein the molecular weight of the polyol is from about 2500 to 4500 and the ethylene oxide units comprise from about 10% to about 15% by weight of the molecule are particularly suitable. The polyols having a molecular weight of about 4000 with about 10% attributable to ($CH_2CH_2O$) units are particularly good. Also useful are alkoxylated fatty amines, amides, alcohols and the like, including such alkoxylated fatty acid derivatives treated with $C_9$ to $C_{16}$ alkyl-substituted phenols (such as the mono- and di-heptyl, octyl, nonyl, decyl, undecyl, dodecyl and tridecyl phenols), as described in U.S. Pat. No. 3,849,501, which is also hereby incorporated by reference in its entirety.

These compositions of our invention may also contain other additives such as those previously described, and other metal containing additives, for example, those containing barium and sodium.

The lubricating composition of the present invention may also include copper lead bearing corrosion inhibitors. Typically such compounds are the thiadiazole polysulphides containing from 5 to 50 carbon atoms, their derivatives and polymers thereof. Preferred materials are the derivatives of 1,3,4-thiadiazoles such as those described in U.S. Pat. Nos. 2,719,125; 2,719,126; and 3,087,932; especially preferred is the compound 2,5 bis (t-octadithio)-1,3,4-thiadiazole commercially available as Amoco 150. Other similar materials also suitable are described in U.S. Pat. Nos. 3,821,236; 3,904,537; 4,097,387; 4,107,059; 4,136,043; 4,188,299; and 4,193,882.

Other suitable additives are the thio and polythio sulphenamides of thiadiazoles such as those described in U.K. Patent Specification 1,560,830. When these compounds are included in the lubricating composition, we prefer that they be present in an amount from 0.01 to 10, preferably 0.1 to 5.0 weight percent based on the weight of the composition.

Some of these numerous additives can provide a multiplicity of effects, e.g., a dispersant-oxidation inhibitor. This approach is well known and need not be further elaborated herein.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % (Broad) |
|---|---|---|
| Viscosity Modifier | 0.01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction Modifiers | 0.01–1.5 | .01–5 |
| Mineral Oil Base | Balance | Balance |

When other additives are employed, it may be desirable, although not necessary, to prepare additive concentrates comprising concentrated solutions or dispersions of the novel dispersants of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the dispersants of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted and which include preferred embodiments of the invention. In the Examples, wt.% ethylene in the polymers was determined by FTIR (ASTM Method D3900).

EXAMPLE 1

Free-radical grafting of an ethylene propylene copolymer reacted with maleic anhydride A 2 liter glass reactor is charged with 800 gm of an ethylene content of 50 wt. percent, a number average molecular weight of 790 and a terminal vinylidene content greater than 90 percent. The reactor is purged with nitrogen for 2 hours and the temperature of the flask and contents is increased to 150° C. Maleic anhydride (196 gms) is charged to the flask and then 30 gms of di-tertiary butyl peroxide is added over the course of 4 hours. The reaction is then continued for an additional 5 hours. The temperature is then increased to 180° C., and unreacted maleic anhydride and catalyst decomposition products are removed under a reduced pressure of 0.5 mm. The resulting modified ethylene propylene copolymer is a grafted adduct with about 22 gms of maleic anhydride grafted per 100 gms of original polymer. This corresponds roughly to about 2 molecules of maleic anhydride grafted per molecule of ethylene propylene copolymer.

EXAMPLE 2

Amination of the product in Example 1 with an amine which contains only 1 reactive nitrogen 200 gms of the modified polymer of Example 1 are placed in a suitable glass reactor. 72 grams of N-(3-aminopropyl) morpholine are added to the reactor (corresponding approximately to stoichiometric equivalence to grafted maleic anhydride) and the temperature increased to 160° C. Stirring the mixture is continued for 3 hours, and then a stream of nitrogen is maintained through the reaction mixture to remove unreacted N-(3-aminopropyl) morpholine and water of reaction. The temperature is then raised to 180° C. for 30 minutes to complete the removal. The reaction product is a gel-free imide product which is effective as a dispersant.

EXAMPLE 3
Amination of the product of Example 1 with a polyamine and a chain stopper (polyisobutenyl succinic anhydride)

200 gms of the modified polymer of Example 1 are placed in a suitable glass reactor equipped with adequate stirring. The reactor is purged with nitrogen for 30 minutes and the contents are heated to about 100° C. About 350 gms of polyisobutenyl succinic anhydride having an ASTM. D-64 Sap. No. 112 which are diluted with 350 gms of solvent 100N diluent oil are added to the polymer with stirring and the temperature is raised to about 190° C. The reaction mixture is held at that temperature with nitrogen stripping for 3 hours, followed by cooling. The resulting product is a viscous liquid substantially free of gel.

EXAMPLE 4
Free-radical grafting of ethylene propylene copolymer reacted with maleic anhydride A 2 liter glass reactor is charged with 800 gm of an ethylene propylene random copolymer having an ethylene content of about 50%, a number average molecular weight of about 1900 (0.42 moles) and a terminal vinylidene content of greater than 60%. The reactor is heated to 100° C. and purged with nitrogen for 2 hours. The contents of the flask are heated to 150° C. Maleic anhydride (88 gm) is charged to the flask and 8 gms of ditertiary butyl peroxide is added over the course of 2 hours, and the reaction is continued for an additional 4 hours. The temperature is then increased to 180° C., and unreacted maleic anhydride and catalyst decomposition products are removed under a reduced pressure of 0.5 mm. The resulting adduct is a grafted ethylene propylene copolymer with about 10 gms of maleic anhydride grafted per 100 gms of polymer, or roughly 2 molecules of maleic anhydride per molecule of copolymer on the average.

EXAMPLE 5
Esterification of the product of Example 4 in presence of chain-stopper About 200 gms of the product of Example 4 (about 0.105 moles of anhydride) is mixed with 100 gms of mineral oil (solvent 150N) and 15 gms of pentaerythritol in the presence of 0.2 gms of stannous octanoate as an esterification catalyst. 4 gms of normal hexanol (about 0.04 moles) is added as a chain stopper and the mixture is heated to 175° C. with reflux for about 3 hours. The reaction mixture is nitrogen stripped for one-half hour. The reaction mixture is filtered, collected and demonstrated to be substantially gel-free. The resulting material is an effective dispersant and viscosity modifier.

EXAMPLE 6
Esterification of product of Example 4 in presence of chain-stopper The reaction protocol of Example 2 is followed, except that 5 gms of N-(-3-amino propyl morpholine) is employed as a monoreactive amine chain stopper. The reaction is run under similar conditions as Example 2 with reflux for 5 hours and the resultant mixture is nitrogen stripped for one-half hour at reaction temperature. The resulting material is substantially gel-free and is an effective dispersant and viscosity modifier.

What is claimed is:

1. A process for producing gel-free oil soluble dispersant additive composition for use in an oleaginous composition selected from lubricating oils and fuel oils, which comprises:
   (A) providing an oil soluble polymer selected from α-olefin homopolymer and interpolymer, wherein said polymer has a number average molecular weight of from about 700 to about 10,000 and a polydispersity of from about 1 to about 5, and wherein at least about 30% of the chains of said polymer possess terminal ethenylidene unsaturation;
   (B) providing monounsaturated carboxylic reactant suitable for grafting carboxylic acid producing moieties onto said polymer;
   (C) contacting said polymer and said monounsaturated carboxylic reactant, in the presence of free radical initiator, under conditions and for a time suitable for grafting said polymer with carboxylic acid producing moieties randomly along the polymer chains of said polymer such that a grafted polymer is formed, wherein said grafted polymer is substituted with an average of from 1 to 3 carboxylic acid producing moieties per polymer chain and has a concentration of unreacted polymer of less than about 25 wt. %;
   (D) providing at least one non-aromatic post-treating reactant suitable for reacting with the grafted polymer from step (C) through said carboxylic acid producing moieties, said reactant being selected from the group consisting of (i) amine compounds containing only a single reactive amino group per molecule, (ii) alcohol compounds containing only a single hydroxy group per molecule, (iii) polyamine compounds containing at least two reactive amino groups per molecule, (iv) polyol compounds containing at least two reactive hydroxy groups per molecule, (v) aminoalcohol compounds containing at least one reactive amino group and at least one reactive hydroxy group per molecule, and (vi) mixtures of (i) to (v); provided that when the post-treating reactant contains more than one reactive group per molecule, said post-treating reactant is used in combination with a chain-stopping or end-capping co-reactant capable of reacting with the grafted polymer from step (C) through said carboxylic acid producing moieties or with at least a portion of the reactive groups of said post-treating reactant containing more than one reactive group per molecule;
   (E) contacting the grafted polymer from step (C) with said post-treating reactant or with said post-treating reactant and said chain-stopping or end-capping co-reactant from step (D) under conditions and for a time suitable for reacting said grafted polymer through said carboxylic acid producing moieties to form said oil soluble gel-free dispersant additive composition.

2. The process according to claim 1, wherein the polymer reactant in step (A) comprising ethylene/α-olefin interpolymer.

3. The process according to claim 1, wherein the polymer reactant in step (A) comprises α-olefin homopolymer or interpolymer of at least two α-olefins.

4. The process according to claim 1, wherein said non-aromatic post-treating reactant comprises (i) at least one amine containing only a single reactive amino group per molecule.

5. The process according to claim 1, wherein said non-aromatic post-treating reactant comprises (ii) at least one alcohol containing only a single reactive hydroxy group per molecule.

6. The process according to claim 1, wherein said non-aromatic post-treating reactant comprises (iii) at least one polyamine containing more than reactive amino group per molecule.

7. The process according to claim 1, wherein said non-aromatic post-treating reactant comprises (iv) at least one polyol containing more than one reactive hydroxy group per molecule.

8. The process according to claim 1, wherein said non-aromatic post-treating reactant comprises (v) at least one aminoalcohol containing at least one reactive amino group and at least one reactive hydroxy group per molecule.

9. The process according to claim 1, wherein said chain-stopping or end-capping co-reactant is selected from the group consisting of (a) $C_{12}$–$C_{400}$ hydrocarbyl substituted succinic acid or anhydride, (b) long chain monocarboxylic acid of the formula RCOOH where R is $C_{12}$–$C_{400}$ hydrocarbyl, (c) amine compounds containing only a single reactive amino group per molecule, (d) alcohol compounds containing only a single reactive hydroxy group per molecule, and (e) mixtures of (a)–(d).

10. The process according to claim 2, wherein said ethylene/α-olefin interpolymer comprises from about 20 to about 80 wt. % of units derived from ethylene and from about 20 to about 80 wt. % of units derived from at least one $C_3$ to $C_{28}$ α-olefin.

11. The process according to claim 1, wherein the oil soluble starting polymer has a number average molecular weight of from about 800 to about 5,500 prior to being grafted.

12. The process according to claim 1, wherein at least about 60% of the chains of said starting polymer possess terminal ethenylidene unsaturation prior to being contacted with said monounsaturated carboxylic reactant in step (C).

13. The process according to claim 1, wherein said polymer comprises α-olefin selected from the group consisting of propylene and butene-1.

14. The process according to claim 4, wherein said amine compound selected from the group consisting of N,N-dimethylaminopropyl amine; N,N-dimethylamioethyl amine; N-(2-aminoethyl)morpholine; N-(2-aminoethyl)piperidine; N-(3-aminopropyl)morpholine; and N-(3-aminopropyl)piperidine.

15. The process according to claim 9, wherein said chain-stopping or end-capping co-reactant comprises a $C_{12}$ to $C_{49}$ hydrocarbyl substituted succinic acid or anhydride.

16. The process according to claim 15, wherein said chain-stopping or end capping co-reactant comprises a $C_{12}$ to $C_{18}$ hydrocarbyl substituted succinic acid or anhydride.

17. The process according to claim 9, wherein said co-reactant comprises a $C_{50}$ to $C_{400}$ hydrocarbyl substituted succinic acid or anhydride.

18. The process according to claim 17, wherein said co-reactant comprises polyisobutenyl succinic anhydride.

19. The process according to claim 9, wherein said co-reactant comprises a long chain monocarboxylic acid of the formula RCOOH where R is $C_{12}$–$C_{400}$ hydrocarbyl.

20. The process according to claim 6, wherein the polyamine compound comprises from about 2 to about 60 total carbon atoms and about 2 to about 12 nitrogen atoms per molecule.

* * * * *